US012605708B2

(12) United States Patent
Sarofim

(10) Patent No.: US 12,605,708 B2
(45) Date of Patent: Apr. 21, 2026

(54) SYSTEM AND METHOD FOR SEPARATING AN AQUEOUS LIQUID INTO AT LEAST TWO CAVITIES

(71) Applicant: Roche Molecular Systems, Inc., Pleasanton, CA (US)

(72) Inventor: Emad Sarofim, Hagendorn (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 0 days.

(21) Appl. No.: 17/462,638

(22) Filed: Aug. 31, 2021

(65) Prior Publication Data

US 2022/0062903 A1 Mar. 3, 2022

(30) Foreign Application Priority Data

Sep. 1, 2020 (EP) .................................... 20193896

(51) Int. Cl.
*G01N 33/68* (2006.01)
*B01L 3/00* (2006.01)
*C08L 83/06* (2006.01)

(52) U.S. Cl.
CPC ... *B01L 3/502753* (2013.01); *B01L 3/502715* (2013.01); *B01L 2200/16* (2013.01); *C08L 83/06* (2013.01)

(58) Field of Classification Search
CPC ......... B01L 3/502753; B01L 3/502715; B01L 2200/16; C08L 83/06
USPC ................................................ 422/502, 500
See application file for complete search history.

(56) References Cited

U.S. PATENT DOCUMENTS 4,990,555 A * 2/1991 Trego .................... C08G 77/16 524/424
6,143,496 A 11/2000 Brown et al.
6,271,299 B1 8/2001 Alvarez et al.
9,371,557 B2 6/2016 Li et al.
2003/0138973 A1 7/2003 Wagner et al.
2016/0299101 A1 10/2016 Pantoja et al.
2016/0325279 A1 11/2016 Sawada et al.

FOREIGN PATENT DOCUMENTS

AU 2003262452 A1 * 11/2003 ........... G01N 33/543
CA 2467587 A1 6/2003
CN 103733059 A 4/2014
CN 107532333 A 1/2018
CN 110437992 A 11/2019
DE 102018204624 A1 10/2019
EP 0672725 A2 9/1995
EP 0674009 A2 9/1995
EP 1867733 A1 12/2007
(Continued)

OTHER PUBLICATIONS

Fouquet, Thierry et al., Rapid Commun. Mass Spectrom. 2012, 26, 2057-2067. (Year: 2012).*
(Continued)

*Primary Examiner* — Christine T Mui
(74) *Attorney, Agent, or Firm* — Maneesh Gupta

(57) ABSTRACT

The present disclosure relates to a method for separating an aqueous liquid comprising biological material into at least two cavities, the use of a polysiloxane having at least one hydroxy group in such a method, as well as a system for separating an aqueous liquid into at least two cavities.

12 Claims, 6 Drawing Sheets

(56) References Cited

FOREIGN PATENT DOCUMENTS

| | | | |
|---|---|---|---|
| EP | 2012126 | A1 | 1/2009 |
| JP | H07265100 | A | 10/1995 |
| JP | 2016513468 | A | 5/2016 |
| WO | 8103496 | A1 | 12/1981 |
| WO | 9847003 | A1 | 10/1998 |
| WO | 0068336 | A1 | 11/2000 |
| WO | 2016134370 | A1 | 8/2016 |
| WO | 2017201315 | A1 | 11/2017 |
| WO | 2019144050 | A2 | 7/2019 |

OTHER PUBLICATIONS

Crompton, T. R., "Comprehensive Organometallic Analysis", ISBN 978-1-4615-9498-7, 2020, Chapter J "Determination of Silicon-bound Hydroxy Groups", pp. 1-883, in particular, pp. 134-135. (Year: 2020).*

* cited by examiner

SYSTEM AND METHOD FOR SEPARATING AN AQUEOUS LIQUID INTO AT LEAST TWO CAVITIES

CROSS-REFERENCE TO RELATED APPLICATION

This application claims the benefit and priority of European Application Serial No. 20193896.6, filed Sep. 1, 2020, which is incorporated herein by reference.

TECHNICAL FIELD

In general, the present disclosure relates to the technical field of systems and methods for separating an aqueous liquid e.g. comprising biological material, into at least two cavities, as for example applicable in microfluidic devices for diagnostic assays, in which it is often a goal to be able to carry out multiple different assays of one or more test samples on the same microfluidic device, usually in the form of a disposable device. Thereby, independently analyzing one or more test samples with multiple different reagents in the course of a single analytic process can be achieved, wherein only small amounts of test sample are necessary.

In more detail, the present disclosure relates to a method for separating an aqueous liquid comprising biological material into at least two cavities, the use of a polysiloxane having at least one hydroxy group in such a method, as well as a system for separating an aqueous liquid into at least two cavities.

In particular, the present disclosure is directed to an improved system and method for separating an aqueous liquid comprising biological material into at least two cavities with which the volume of sample liquid is separated as thoroughly and as productive as possible.

BACKGROUND

In the field of diagnostic assay technology, there is a general need to make diagnostic assays faster, cheaper and simpler to perform while achieving precision as well as efficiency of conventional laboratory processes. In order to achieve this advantageous goal, substantial effort has been made in order to achieve miniaturization and integration of various assay operations, in order to be able to increase the number of parallel assays on one single device.

Some class of analysis base on the execution of multiple independent analysis of a sample in independent reaction-volumes. Up to date there are two major concepts to execute such independent reactions: either in multitude of basically aqueous droplets of the sample, being separated by an immiscible fluid (e.g. an oil), or by conducting the independent reactions in a multitude of reaction chambers in a support, where the independent reactions are at least partially separated by parts of the reaction chambers.

Such miniaturized reaction chambers may be used to analyze various biological materials, such as proteins, deoxyribonucleic acid (DNA) or ribonucleic acid (RNA). Today, there are various sizes of such microfluidic devices comprising from only a few (such as 96) to tens of thousands of reaction chambers, such as microfluidic chips of digital polymerase chain reaction technology (dPCR).

These microfluidic devices provide microscale channels to receive microliter or nanoliter-scale samples in the form of streamable/flowable liquid. In general, such microfluidic devices feature at least one void providing a separating space, and at least two cavities in fluidic connection with the void and separated by the separating space.

In general, for conducting a diagnostic assay, such as a PCR assay, the microfluidic device is initially filled with an aqueous liquid, usually comprising a biological sample, wherein the aqueous liquid is introduced by means of a pipette, a pump, hydrostatic pressure, differential pressure, capillary force, or the like, e.g. via an inlet opening. Thereafter, usually a separation fluid, is introduced e.g. through the inlet opening into the flow channel which, at first, pushes any remaining aqueous liquid into any remaining empty cavities, and, covers filled cavities, thereby fluidically separating the individual cavities from their surroundings and, in particular, from each other in order to avoid any cross contamination or pollution. After the initial filling process and the subsequent separation process, also referred to as sealing process, are finished, the microfluidic device is usually subjected to an analytical step, such as the determination of the absence, presence, activity or concentration of biological material in the aqueous liquid. Thereby, generally, each cavity that contains one or more targets will yield a positive signal, wherein, after e.g. thermal cycling, the ratio of positive and negative signals will allow to accurately calculate the initial target concentration in the sample, for example by means of luminescence or fluorescence test measurements. Such technologies allow a plurality of assays to be carried out simultaneously on a miniaturized scale in independent reaction-volumes. Examples of such analysis are “digital” PCR, digital isothermal amplification, digital RT-PCR and other digital enzyme based reactions.

Consequently, in order to conduct this kind of analysis, means and methods are required to easily distribute the sample into multiple miniaturized cavities on one hand, and keep the cavities tightly sealed during the following analytical step, such as a reaction as e.g. PCR.

In any case, it is crucial to keep all, or a high percentage of the cavities isolated. By “isolated” it is meant, that a reaction happening in one cavity does not affect the reaction or outcome of other, typically neighbored, cavities. Cross contamination between adjacent reaction chambers is known as “leakage”, whose further synonyms are crosstalk or carry-over. Leakage means that the aqueous liquid is not perfectly separated to the cavities. Instead, an aqueous film between at least two cavities still connects the aqueous liquids of both and allows exchange of components of one cavity to the other. Leakage negatively impacts the quality of a result, as the number of positive reactions is no more the same as without leakage.

Leakage may sometimes be caused by incomplete unwetting of the aqueous liquid, i.e. when the separation liquid (today usually a silicone oil) is introduced and a residual aqueous film, connecting several cavities, is left.

Common separation liquids for separating aqueous liquids into at least two cavities of the state of the art are, e.g. those that are substantially immiscible with the sample of fluid medium to be isolated, such as resins, monomers, mineral oil, silicone oil, fluorinated oils, and other fluids which are preferably substantially non-miscible with water (U.S. Pat. No. 6,143,496A). Further examples are light mineral oil, fluorinated fluid, a fluorinated alcohol, Fluorinert, a Tegosoft®, Tegosoft® DEC, or a combination thereof (see WO 2019/144050 A2).

In U.S. Pat. No. 9,309,557 B2, methods for nucleic acid amplification comprising forming a reaction mixture, and subjecting the reaction mixture to conditions suitable for nucleic acid amplification are described. In an exemplary method, an aqueous solution is applied into wells of the structure defining an array of wells. The aqueous solution in the wells can be isolated by providing an immiscible fluid over the wells. An exemplary immiscible fluid includes mineral oil, silicone oil (e.g., poly(dimethylsiloxane)), heptane, carbonate oils (e.g. diethylhexyl carbonate (Tegosoft® DEC)), or combinations thereof.

However, the oils of the state of the art still have the disadvantage that they lead to leaking when used as separation liquid in a method for separating an aqueous liquid comprising biological material into at least two cavities. Accordingly, there remains a need for improved methods and systems for separating acqueous liquid to address such leaking.

SUMMARY OF THE DISCLOSURE

In an embodiment of the present disclosure, a method for separating an aqueous liquid comprising biological material into at least two cavities is provided. The method comprises a) providing a device having at least one void providing a separating space, and at least two cavities in fluidic connection with the void and separated by the separating space; b) supplying each of the at least two cavities with the aqueous liquid; and c) supplying the separating space with a separation liquid for separating the aqueous liquid into the at least two cavities; and, d) analyzing the aqueous liquid, wherein the step of analyzing the aqueous liquid comprises determining the absence, presence, activity or concentration of biological material in the aqueous liquid (40). The separation liquid may comprise a polysiloxane having at least one hydroxy-group.

In another embodiment of the present disclosure, a system for separating an aqueous liquid into at least two cavities is provided. The system may comprise a device having at least one void providing a separating space and at least two cavities in fluidic connection with the void and separated by the separating space, an aqueous liquid source comprising an aqueous liquid including biological material, for supplying the device with aqueous liquid, and a separation liquid source for supplying the device with separation liquid for separating the aqueous liquid into the at least two cavities. The separation liquid may comprise a polysiloxane having at least one hydroxy-group.

DETAILED DESCRIPTION

Figure 1:
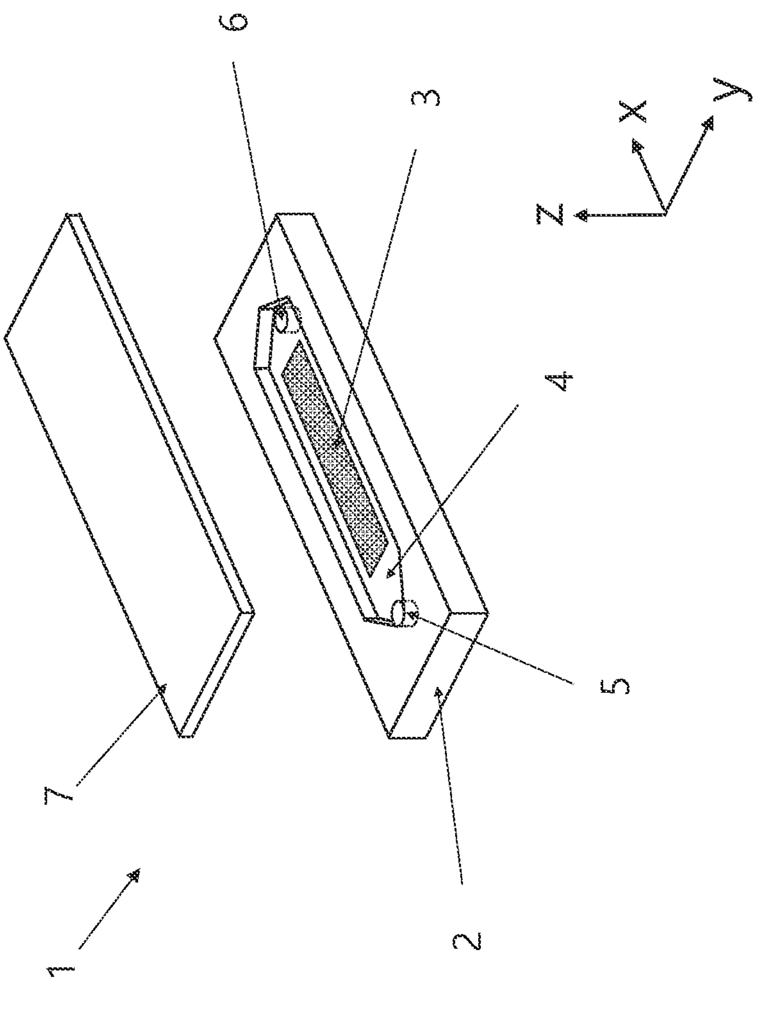
FIG. 1 is an exploded schematic illustration of a device for conducting multiple analysis in parallel as used in an embodiment of the method or the system of the present disclosure.

The object of the present disclosure is to provide a separation liquid, which has improved properties separating the aqueous liquid in the cavities and, therefore, reduced cross contamination between reactions in adjacent cavities.

Surprisingly, it has been found that a separation liquid comprising at least a polysiloxane having at least one hydroxy-group, or consisting of a polysiloxane having at least one hydroxy-group shows superior performance for separating aqueous liquid in cavities.

As the examples below indicate, all reference liquids tested showed frequent to occasional leakage, i.e. in 1 to 100% of the cavities of a device, when applied to separate the aqueous liquid to the different cavities. In contrast, all separation liquids according to the present disclosure had a much lower rate of leakage from only 0 to 0.1% of the cavities and, thereby, lead to at least a 10-fold reduction of leakage.

Accordingly, in a first aspect, the present disclosure relates to a method for separating an aqueous liquid comprising biological material into at least two cavities, the method comprising the steps of:

a) providing a device having at least one void providing a separating space, and at least two cavities in fluidic connection with the void and separated by the separating space;
b) supplying each of the at least two cavities with the aqueous liquid; and
c) supplying the separating space with a separation liquid for separating the aqueous liquid into the at least two cavities; and, optionally,
d) analyzing the aqueous liquid, preferably wherein the step of analyzing the aqueous liquid comprises determining the absence, presence, activity or concentration of biological material in the aqueous liquid, wherein the separation liquid in step c) comprises at least a polysiloxane having at least one hydroxy-group, or consists of a polysiloxane having at least one hydroxy-group.

The method of the first aspect of the present disclosure relates to separating an aqueous liquid comprising biological material into at least two cavities.

The term "aqueous liquid" describes any liquid comprising water. For example, the aqueous liquid may comprise any liquid substance known to the person skilled in the art to be miscible with water and to be generally suitable to comprise biological material in in a state suitable for analysis or in its natural state. Moreover, the aqueous liquid may comprise one or more liquid substances, being at the concentration of use water miscible.

Suitable liquid substances are well-known to the person skilled in the art and comprise, e.g. water, glycerol, diemethyl-sulfoxid (DMSO), and/or N,N-dimethlyl-formamid.

Preferably, the aqueous liquid used in the method according to the first aspect of the disclosure comprises at least 5%, at least 10%, at least 20%, at least 30%, at least 40%, at least 50%, at least 60%, at least 70%, at least 75%, at least 80%, at least 90% or at least 95% water by volume. Moreover, the aqueous liquid may also comprise water as the only liquid substance.

The aqueous liquid may further comprise reagents allowing for analyzing the biological material. The term "reagent" describes any substance or compound added the aqueous liquid to cause or support a chemical reaction suitable for analyzing the biological material. Such reagents usually depend on the kind of biological material to be analyzed (such as nucleic acid, protein, etc.) and also the assay used to analyze the biological material.

For example, the aqueous liquid may comprise buffer solutions that are e.g. suitable for the analysis of biological materials, such as PCR. Suitable buffers are well-known to the person skilled in the art, such as 4-(2-hydroxyethyl)-1-piperazineethanesulfonic acid (HEPES) buffer, 2-(N-morpholino) ethanesulfonic acid (MES) buffer, tris(hydroxymethyl)aminomethane (Tris) buffer, 3-(N-morpholino) propanesulfonic acid (MOPS) buffer or phosphate-buffered saline (PBS) buffer.

The aqueous liquid may also comprise organic or inorganic acids and/or salts, such as salts comprising magnesium (e.g. $Mg^{2+}$, such as $MgCl_2$). The aqueous liquid may also comprise surfactants, suitable for the analysis or wetting reasons of the device, such as Tween 20, SDS (sodium dodecyl sulfate), dodecyl-maltoside, or CHAPS.

Moreover, the aqueous liquid may comprise further substances known to the person skilled in the art to be suitable or necessary for analyzing biological material, such as enzymes (e.g. polymerases or reverse transcriptase), stabilizers of the biological material, enzyme inhibitors (e.g. for inhibiting enzymes targeting the biological material, such as DNase, RNase or protease activities, such as ethylenediaminetetraacetic acid (EDTA) or ethylene glycol-bis(β-aminoethyl ether)-N,N,N', N'-tetraacetic acid (EGTA)), dNTPs, antibodies or fragments thereof, primer, nucleoside triphosphates or markers and probes suitable for the detection of biological material (e.g. fluorescent or luminescent markers).

For example, for a PCR or an isothermal amplification reaction, an aqueous liquid comprising nucleic acid may for example be combined with a polymerase, a reverse transcriptase, enzyme inhibitors (e.g. for inhibiting DNase or RNase activities, such as ethylenediaminetetraacetic acid (EDTA) or ethylene glycol-bis(β-aminoethyl ether)-N,N,N', N'-tetraacetic acid (EGTA)), antibodies or fragments thereof, primer, and/or nucleoside triphosphates or markers (e.g. fluorescent or luminescent markers).

In a further preferred embodiment of the first aspect of the present disclosure, the aqueous liquid comprises reagents allowing for analyzing the biological material.

The term "biological material" describes any kind of organic matter, which may potentially be an analyte of interest. Suitable biological material may have a natural origin or may be artificially generated. Suitable biological material may comprise e.g., nucleic acids, amino acids or sugars which may be present as single molecules or may further be connected to larger nucleic acid structures, peptides, proteins or di-, oligo- or polysaccharides of any size or length. For example, biological material may comprise any kind of single- or double-stranded DNA (e.g. cDNA), single-or double-stranded RNA (e.g. mRNA, miRNA or siRNA), protein, peptide, polysaccharides or mixtures thereof. Biological material may further comprise molecules combined out of these components.

As such biological material, biological test samples are usually used, which are often taken from patients by medical personnel for laboratory analysis, e.g. for determining concentration levels of different components within the taken samples. The biological material can further be derived from any biological source, such as a physiological liquid, including blood, serum, saliva, ocular lens liquid, cerebrospinal liquid, sweat, urine, fecal, semen, milk, ascites liquid, mucous, synovial liquid, peritoneal liquid, amniotic liquid, tissue, cultured cells, or the like, wherein the sample can particularly be suspected to contain a certain antigen or nucleic acid.

Preferably, the aqueous liquid comprising biological material is a biological sample, more preferably isolated from a human and/or being a blood, serum, tissue, saliva, urine or fecal sample.

Suitable concentrations of biological material in the aqueous liquid of the first aspect of the present disclosure are well-known to the person skilled in the art. For example, the aqueous liquid of the first aspect of the present disclosure may comprise e.g. 1 to 20 ng/μl DNA or RNA, but also single molecules may be sufficient, or 0.003-15 mg/ml of protein, or e.g. 0 to ~1 molecule of analyte per cavity volume.

Step a)

The method according to the first aspect of the present disclosure comprises step a), which comprises providing a device having at least one void providing a separating space, and at least two cavities in fluidic connection with the void and separated by the separating space.

The term "device" describes any device known by the person skilled in the art to be suitable for performing the method according to the first aspect of the disclosure, such as a single carrier device (e.g. a microfluidic device, such as a microfluidic chip). These usually provide microscale channels and microscale reaction areas receiving microliter or nanoliter-scale samples in the form of flowable aqueous liquid.

Usually, the device comprises two parts, e.g. a microfluidic device can exhibit a structure consisting of at least a top layer and a bottom layer, wherein either the top layer or the bottom layer can provide one or more arrays of reaction areas, an inlet and an outlet opening.

The void is established between the top layer and the bottom layer and is in fluid connection with the array of reaction areas which can be implemented in the form of at least two cavities (such as microwells or nanowells), thereby rendering a microfluidic device to be, for example, a microfluidic chip in the form of a microwell or a nanowell plate. For example, the width of the entire void, also referred to as lane width, can reside in a range between 0.5 mm and 20 mm, such as 6.4 mm, preferably between 1 and 10 mm, which usually provides space in width for about 1 to 100 cavities per mm width, most typical 4 to 40 cavities per mm width next to each other, i.e. in a lateral direction of the void.

Suitable devices for separating an aqueous liquid comprising biological material into at least two cavities are well-known to the person skilled in the art. Preferably, the device is in the form of a consumable/disposable. Also preferably, the device is suitable for methods for analyzing biological material, such as by PCR. Moreover, the device may be made from a transparent material suitable to detect fluorescence or luminescence signals occurring during the analyzing of the aqueous liquid, such as plastic or glass. As material for the device, such as a microfluidic device, i.e. for the device layers, materials such as cyclic olefin copolymer (COC), cyclic olefin polymer (COP), or the like can be used, wherein the use of COP is preferable, for example due to cost considerations.

The void provides a separating space, which is arranged in fluid connection with the at least two cavities. In general, the dimensions of the void are suitable to cause capillary forces, if the void is supplied with aqueous liquid, and the capillary forces are sufficient to cause the filling of the separating space and the cavities with aqueous liquid. The height of the entire void can be in a range of 10 μm to 1 mm, preferably between 40 μm and 400 μm. Further, the length of the entire void can be in a range of 1 mm to 200 mm, preferably between 10 mm and 120 mm.

The device further comprises at least two cavities, which may constitute a so-called structured area with the cavities as micro- or nanostructures. For example, the area of cavities may have a size of 6 mm×85 mm. Preferably, the cavities are arranged at the bottom of the void, i.e. on the side opposed to the cover. In general, the cavities immobilize and separate aqueous liquid and, thereby, provide depositories and/or reaction vessels for the aqueous liquid.

The surface of the at least two cavities and the separating space may be hydrophilic and/or hydrophobic. Preferably, the at least to cavities and/or the separating space have a hydrophilic surface.

A cavity may have a volume of 0.01 nl to 1 μl. Preferably a cavity has a volume of 0.02 to 200 nl, more preferably 0.05 to 50 nl, and most preferably 0.1 to 5 nl. For example, a cavity may have a volume of 0.1 nl, 1 nl or 3 nl. The length×width×depth of a cavity may be 0.2 mm×0.1 mm×0.16 mm, 0.15 mm×0.07 mm×0.12 mm or 0.06 mm×0.03 mm×0.06 mm.

A cavity may have any shape that may be suitable to be completely filled with liquid and only having a low risk of allowing the remaining of air bubbles. The cross-sectional area of an opening of each cavity can have a circular shape, an oval shape, or a polygonal shape, such as a hexagonal shape. With a polygonal shape of the cavity opening, and particularly with a hexagonal shape of the cavity opening, it becomes possible to arrange the cavity openings to each other with less distance in between, i.e. achieve an increased density of distribution of cavities openings inside the void, such as by a honeycomb arrangement. Accordingly, the number of cavities in the array of wells of the plate can be further maximized. Moreover, a width of the cavity opening, including an intermediate space between wells, can be 60 μm≤w≤110 μm, such as 62 μm (small well)≤w≤104 μm (big cavity).

The number of cavities of the device is preferably at least 96, more preferably at least 1,536, even more preferably at least 10,000 and most preferably at least 100,000 per device. For example, the device may have 20,000, 30,000 or 100,000 cavities.

Examples are conducting 20'000 dPCR reactions of one sample volume of 40 μl, or conducting 100'000 reactions forming a volume of 10 μl. But, by a matter of fact the total number of reactions can be very low to several million, the total volume per sample form 1 μl to several 100 μl.

The term "in fluidic connection" describes that two spaces are not separated from each other by any kind of obstacle that may hinder a liquid that is filled into the one of these spaces to flow to the other space. So the expression "the at least two cavities in fluidic connection with the void" describes that the at least two cavities are not separated from the void by any kind of obstacle that may hinder a liquid that is filled into the void to flow into any one of the cavities.

The term "separated by the separating space" describes that the at least two cavities are spatially separated by the separating space so that they form distinct spaces. However, even if the at least two cavities are spatially separated from the separating space, they may still be in fluid connection with the separating space.

In a preferred embodiment of the first aspect of the present disclosure, the aqueous liquid separated into the at least two cavities is separated into portions that are identical and/or different from each other. Thereby, any number of cavities may comprise portions that are identical, while any number of cavities may comprise portions that are different.

Usually, if a liquid is introduced into the void, e.g. via an inlet opening, the liquid first enters the separating space. Subsequently, during the proceeding of the filling of the separating space with aqueous liquid, the liquid enters the at least two cavities simultaneously or consecutively. When the liquid arrives at the end of the separating space, it usually leaves the separating space of the void, e.g. via the outlet opening. This means that the separating space may form an area for transitioning liquid from the inlet opening to the outlet opening of the void, but also for transitioning liquid into the at least two cavities.

Step b)

Step b) of the method according to the first aspect of the disclosure relates to supplying each of the at least two cavities with the aqueous liquid.

The expression "supplying each of the at least two cavities with the aqueous liquid" describes the providing of aqueous liquid for each of the at least two cavities. However, while the at least two cavities are each supplied with aqueous liquid, it is possible that e.g. due to air bubbles not all cavities are filled with aqueous liquid after step b).

The void is usually filled with aqueous liquid, e.g. through the inlet opening. The void may be filled manually or mechanically with aqueous liquid. For example, the void may be filled manually by contacting a pipette tip of a non-automatic pipette comprising aqueous liquid with the inlet opening and manually injecting the aqueous liquid into the void. The void may also be filled manually by e.g. connecting a capillary to the inlet opening and pumping the aqueous liquid through the capillary into the void using a manual pumping means. Similarly, the void may be filled mechanically by e.g. connecting a flow circuit, such as by a capillary, to the device and pumping the aqueous liquid through the capillary into the void using a mechanical pumping means.

After injection of the aqueous liquid, capillary force, by pressure caused by manual or mechanical supply means, mass inertia, centrifugal force, and/or gravity can also be used to convey the liquids.

The volume of aqueous liquid supplied in step b) of the method according to the first aspect of the disclosure usually is 10 μl to 100 μl.

After step b), preferably at least 10%, at least 25%, at least 50%, at least 75%, at least 90% or at least 100% of the at least two cavities are filled with aqueous liquid.

Step c)

Step c) of the method according to the first aspect of the disclosure relates to supplying the separating space with a separation liquid for separating the aqueous liquid into the at least two cavities.

The expression "separation liquid for separating the aqueous liquid into the at least two cavities" describes that the aqueous liquid in each of the at least two cavities is separated from the aqueous liquid in the other cavities by a layer of separation liquid so that no exchange of biological material, preferably no exchange of any components at all, between the aqueous liquid in these cavities occurs.

A further function of the separation liquid may be to prevent the aqueous liquid in the cavities from evaporating, for example during thermocycling, and flushing any gas bubbles out of the void of the device.

The separation liquid may be introduced into the void, which provides the separating space, using the same manual or mechanical means as used in step b) for introducing the aqueous liquid into the void.

The volume of separation liquid supplied in step c) of the method according to the first aspect of the disclosure usually is 10 μl to 100 μl, depending on the volume of the void.

The separation of the aqueous liquid into the at least two cavities is usually a consequence of supplying the separating space with a separation liquid, which forces aqueous liquid remaining in the separating space, to proceed in the separating space, while the separation liquid covers the cavities supplied with aqueous liquid.

Following step c), 0% to <1% of the cavities may be affected by leakage, i.e. an aqueous film between at least two cavities still connects the aqueous liquids of both and allows exchange of components of one cavity to the other. Preferably, 0% to 0.75%, more preferably 0 to 0.5%, especially more preferably 0 to 0.25% and most preferably 0% to 0.1% of the cavities may be affected by leakage following step c).

Moreover, in step c) of the method according to the first aspect of the disclosure separating space may also be supplied with two or more separation liquids for separating the aqueous liquid into the at least two cavities, which may be supplied at the same time or one after the other.

Step d)

Optional step d) of the method according to the first aspect of the disclosure relates to analyzing the aqueous liquid, preferably wherein the step of analyzing the aqueous liquid comprises determining the absence, presence, activity or concentration of biological material in the aqueous liquid in any of the at least two cavities.

The term "analyzing" describes a quantitative and/or qualitative analytical process. Suitable methods for qualitatively or quantitatively analyzing the biological material of the present application are well-known to the person skilled in the art. For example, the biological material may be analyzed by optical detection of the reaction areas and the reactions occurring therein, such as detecting its inherent features (e.g. its absorbance at specific wavelengths). For example, if the biological material comprises any form of amino acid, peptide or protein, these may be analyzed by measuring absorbance of the aqueous liquid at 280 nm. The biological material may also be analyzed by detecting a signal from a marker attached to the biological material, such as a fluorescence marker or a chemiluminescence marker.

A fluorescence or chemiluminescence marker usually is a molecule that may be attached to a target molecule of the biological material to aid in its detection. Generally, a reactive derivative of a fluorescent molecule (fluorophore) or chemiluminescent molecule is used as a fluorescent or chemiluminescent marker. The marker selectively binds to a specific region or functional group on the target molecule, whereby this attachment may be chemically or biologically.

Suitable fluorescent markers are well-known to the person skilled in the art, such as ethidium bromide, fluorescein, atto fluorescence dyes or green fluorescent protein. Suitable chemiluminescent markers are well-known to the person skilled in the art, such as those converted by horseradish peroxidase enzyme (HRP), such as TMB, DAB, ABTS.

Moreover, fluorescent or chemiluminescent markers may also be used in the form of specific probes for detection of a particular target. Such probes may be generated by attaching the marker to a molecule, which specifically interacts with the target, such as an antibody, a protein, an amino acid or a peptide. In such a case, the fluorescent or chemiluminescent marker attached to the probe only emits a signal if the probe specifically interacts with the biological material.

The step of analyzing biological material preferably comprises determining absence, presence, activity or concentration of biological material in the aqueous liquid, in any of the at least two cavities. Suitable methods are well-known to the person skilled in the art and partly also described elsewhere, e.g. fluorescence imaging.

The term "absence" describes the condition that the targeted biological material is not detectable in the aqueous liquid. However, this does not exclude that the targeted biological material is present, but in amounts that are too low to be detected by common methods that are well-known to the person skilled in the art to be suitable for the detection of the specific targeted biological material. An example for the detection limit for nucleic acids is 1 molecule per partition. Any other method (ELISA or similar) may in principle show a similar level of sensitivity. Here, as an example, in case of a cavity volume of 1 nl, the detection limit may be 1 molecule per 1 nl.

The term "presence" describes the condition that the aqueous liquid comprises the biological material that was searched for irrespective of the actual amount or concentration of the targeted biological material in the aqueous liquid.

The term "activity" describes that the biological material in the aqueous liquid performs or catalyzes a chemical reaction, for example by converting a substrate targeted by the biological material into a product. An example is the enzyme activity of proteins, which usually is detectable by substrate conversion, e.g. by measuring the amount or concentration of the substrate, an intermediate product and/or the product in the aqueous liquid. Methods for measuring substrate conversion are well-known to the person skilled in the art. Depending on the specific biological material, such as the enzyme, it may be necessary to include components necessary for the reaction into the aqueous liquid before supplying it to the device, such as the substrate, enzymatic coenzymes (e.g. adenosine triphosphate (ATP); nicotinamide adenine dinucleotide (NAD+) or nicotinamide adenine dinucleotide phosphate (NADP+)) or cofactors (e.g. inorganic ions, such as $Fe^{2+}$, $Mn^{2+}$ or $Zn^{2+}$).

The term "concentration" describes the total amount or number of units of biological material divided by the total volume of aqueous liquid.

The separation liquid in step c) of the method according to the first aspect of the disclosure comprises at least a polysiloxane having at least one hydroxy-group, or consists of a polysiloxane having at least one hydroxy-group.

The term "polysiloxane" describes any structure being a chain, a ring, or a ladder comprising one or more siloxane (Si—O—Si) bonds in the backbone. Moreover, depending on its position in the molecule (non-terminal or terminal), each Si may be connected to one, two or three residues Rx.

Preferably, the polysiloxane is a linear chain molecule comprising 4 to 400, preferably 5 to 300, more preferably 7 to 250, even more preferably 10 to 200, especially more preferably 10 to 100, and most preferably 15 to 70 units of—[O—$SiRx_2$].

The residues Rx may independently from each other be substituted or unsubstituted linear or branched alkanes, alkenes or alkynes having from 1 to 20 carbon atoms, preferably substituted or unsubstituted $C_1$-$C_{20}$-alkyl, more preferably $C_1$-$C_{12}$-alkyl, such as $CH_3$, —$CH_2$—$CH_3$, —$CH_2$—$CH_2$—$CH_3$, —CH—$(CH_3)_2$ or —$CH_2$ (—$CH_2$)$_p$—$CH_3$ (with p=1 to 10).

Moreover, the residues Rx may independently from each other be substituted or unsubstituted aliphatic, cycloaliphatic, aromatic, heteroaromatic or heterocyclic groups, preferably aromatic groups, having from 1 to 20 carbon atoms, such as phenyl, tolyl or benzyl. The residues Rx connected to the siloxane backbone may further comprise halogens (e.g. fluorine), such as $-CH_2-CH_2-CF_3$, $-CF_2-CF_2-CF_3$ or $-CF_2(-CF_2)_p-CF_3$ (with p=1 to 10).

The Rx residues may also independently from each other be an ether, an ester, a thioester, a thioether, a carbonic acid and/or a thiocarboxylic acid.

A polysiloxane molecule may further comprise mixtures of above-mentioned Rx residues.

Preferably, each Rx may independently be selected from the group consisting of substituted or unsubstituted $C_1$-$C_{20}$-alkyl, preferably $C_1$-$C_{12}$-alkyl, or aromatic groups. Preferably, each Rx may be independently selected from the group consisting of substituted or unsubstituted $C_1$-$C_{20}$-alkyl, preferably $C_1$-$C_{12}$-alkyl, or aromatic groups; preferably, wherein one, two or three hydrogen atoms linked to of each carbon of the $C_1$-$C_{20}$-alkyl, preferably $C_1$-$C_{12}$-alkyl, are independently from the other hydrogen atoms substituted with a halogen, preferably fluor, and/or the aromatic group is a substituted or unsubstituted phenyl, tolyl or benzyl.

The polysiloxane used in the method according to the first aspect of the disclosure has at least one hydroxy-group. The polysiloxane used in the method according to the first aspect of the disclosure may further have at least two hydroxy-groups, at least three hydroxy-groups, at least four hydroxy-groups or at least five hydroxy-groups. Preferably, the polysiloxane has one or two, more preferably two hydroxy groups.

Moreover, the %-mass ratio of hydroxy in the separation liquid may be in range of 0.1% and 5%, preferably in a range of 0.2% to 2.5%, more preferably in range of 0.3% to 1.5%. The %-mass ratio may e.g. be calculated by determining the molar mass of each element present in the separation liquid, determining the mass of each individual element present depending on its frequency, determining the molar mass of each compound and dividing the mass of each element present by the molar mass. The %-mass ratio of hydroxy can be determined by the person skilled in the art, such as by methods described in "Comprehensive Organometallic Analysis", T. R. Crompton, ISBN 978-1-4615-9498-7, Chapter J "Determination of Silicon-bound Hydroxy Groups".

In a further preferred embodiment of the first aspect of the present disclosure, the polysiloxane has one or two, preferably two hydroxy groups, and/or the %-mass ratio of hydroxy in the separation liquid is in range of 0.1% and 5%, preferably in a range of 0.2% to 2.5%, more preferably in range of 0.3% to 1.5%.

The polysiloxane having at least one hydroxy group may comprise a terminal or non-terminal silanole group, wherein the at least one hydroxy-group may be directly connected to a terminal or non-terminal Si. Further, the at least one hydroxy-group may be connected to any one of the residues connected to a non-terminal or terminal Si, for example in a carbinol group.

In a preferred embodiment of the first aspect of the present disclosure, the polysiloxane having at least one hydroxy group comprises a silanole group and/or a carbinol group.

If the polysiloxane has at least two hydroxy-groups, these may independently from each other be terminal or non-terminal silanol and/or carbinol groups.

If the the polysiloxane having at least one hydroxy group comprises a carbinol group, the term "carbinol group" describes any primary, secondary or tertiary alcohol. The carbinol group may be linked to any $C_1$ to $C_{10}$-alkyl group, preferably a $C_1$ to $C_8$-alkyl group, more preferably a $C_2$ to $C_8$-alkyl group and most preferably a $C_2$ to $C_6$-alkyl group.

In a more preferred embodiment of the first aspect of the present invention, in the polysiloxane comprising a carbinol group, the carbinol group linked to a silicon atom of the polysiloxane comprises a $C_1$ to $C_8$-alkyl group, preferably a $C_2$ to $C_6$-alkyl group, where a silanole group stands for a hydroxyl group linked to a Silicone atom, and carbionol group stands for a hydroxyl group linked to a Carbon atom.

In a preferred embodiment of the first aspect of the present disclosure, the polysiloxane is a linear chain molecule comprising 4 to 400, preferably 5 to 300, more preferably 7 to 250, even more preferably 10 to 200, especially more preferably 10 to 100, and most preferably 15 to 70 units of $-[O-SiRx_2]-$, each Rx may be independently selected from the group consisting of substituted or unsubstituted $C_1$-$C_{20}$-alkyl, preferably $C_1$-$C_{12}$-alkyl, or aromatic groups; preferably, wherein one, two or three hydrogen atoms linked to of each carbon of the $C_1$-$C_{20}$-alkyl, preferably $C_1$-$C_{12}$-alkyl, are independently from the other hydrogen atoms substituted with a halogen, preferably fluor, and/or the aromatic group is a substituted or unsubstituted phenyl, tolyl or benzyl.

In a preferred embodiment of the first aspect of the present disclosure, the polysiloxane having at least one hydroxy group has a structure according to formula (I)

(I)

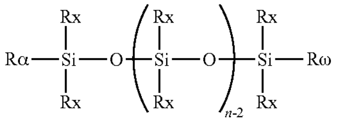

or according to formula (II)

(II)

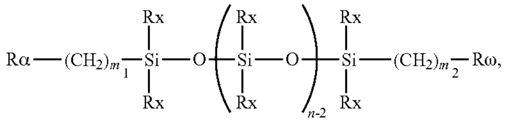

preferably according to formula (III)

(III)

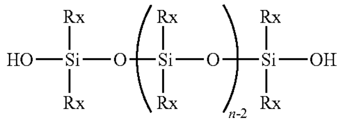

or according to formula (IV)

(IV)

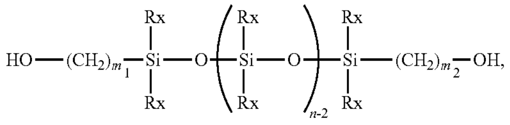

wherein n=4 to 400, preferably 5 to 300, more preferably 7 to 250, even more preferably 10 to 200, especially more preferably 10 to 100 and most preferably 15 to 70;

wherein $m_1$=1 to 10, preferably 2 to 8 and more preferably 2 to 6, wherein $m_2$=1 to 10, preferably 2 to 8 and more preferably 2 to 6, and wherein each Rx is independently selected from the group consisting of $-CH_3$, $-CH_2-CH_3$, $-CH_2-CH_2-CH_3$, $-CH-(CH_3)$ 2, $-CH_2$ $(-CH_2)_p-CH_3$, $-CH_2-CH_2-CF_3$, $-CF_2-CF_2-CF_3$, $-CF_2$ $(-CF_2)_p-CF_3$,phenyl, tolyl and/or benzyl, with p=1 to 10, and wherein at least one Rα or Rω is selected to be —OH, and the other to —OH or $-CH_3$.

In a further preferred embodiment of the first aspect of the present disclosure, the polysiloxane having at least one hydroxy group has a structure according to formula (V)

(V)

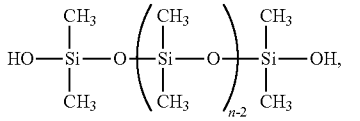

wherein the median of n=4 to 400, preferably 5 to 300, more preferably 7 to 100, even more preferably 10 to 50 and most preferably 10 to 25 and wherein n=4 to 400, preferably 5 to 300, more preferably 10 to 100, even more preferably 15 to 70, and most preferably 20 to 50.

A polysiloxane molecule may further comprise mixtures of above-mentioned Rx residues.

In a preferred embodiment of the first aspect of the present disclosure, the polysiloxane having at least one hydroxy group has a mean molecular weight of 300 to 30,000 g/mol, preferably 400 to 20,000 g/mol, more preferably 600 to 10,000 g/mol, and most preferably 1000 to 6,000 g/mol, and/or the polysiloxane having at least one hydroxy group at 25° C. has a dynamic viscosity of 1 to 1,000 mPas, preferably 2 to 750 mPas, more preferably 5 to 500 mPas, even more preferably 10 to 250 mPas, still more preferably 15 to 200 mPas, and most preferably 20 to 150 mPas.

Methods for measuring the mean molecular weight of the polysiloxane are well-known to the person skilled in the art. For example, the mean molecular weight may be measured by mass spectrometry techniques.

Methods for measuring the dynamic viscosity of the polysiloxane at 25° C. are well-known to the person skilled in the art. For example, the dynamic viscosity of the polysiloxane at 25° C. may be measured by using a rheomoters or a glass capillary viscometer.

The separation liquid comprises or consists of at least a polysiloxane having at least one hydroxy-group. Further, the separation liquid may comprise or consist of at least two polysiloxanes having at least one hydroxy-group, at least three polysiloxanes having at least one hydroxy-group, at least four polysiloxanes having at least one hydroxy-group or at least five polysiloxanes having at least one hydroxy-group.

If the separation liquid comprises at least two polysiloxanes, it may comprise any mixture of above-mentioned polysiloxanes. It may also contain other components such as a linear of cyclic poly-dimethyl-siloxanes, as long as the %-Hydroxy rate is kept within the range as specified.

Methods for determining the composition of the separation fluid are well-known to the person skilled in the art, such as IR-spectroscopy, GC, LS, GC-MS, LC-MS, NMR, gel permeation chromatography, or a combination of such methods.

For example, the general procedure for testing effectiveness in separating an aqueous liquid comprising target-DNA or RNA as biological material by separation liquid may be conducted as follows:

1. A sample containing a target-DNA or RNA to be analyzed may be mixed with a PCR-or RT-PCR, or an isothermal mastermix for PCR, forming a reaction mix, at a concentration of preferably in a range of 0.05 to 0.4 molecules per cavity volume; resulting, in a 5 to 40% rate of positive cavities.
2. A device having a multitude of cavities may be provided.
3. The reaction mix may be introduced into the device, thereby filling the cavities.
4. The separation liquid may be introduced into the device and thereby separates the reaction mix in the cavities.
5. The reaction may be triggered or started and during or thereafter, the signal of each cavity may be detected.
6. An analytical result may be derivated from the observed signals of the cavities.
7. Analyzing the analytical result and the device for leakage e.g. by visual inspection e.g. using a fluorescence microscope and/or comparing the number of positive cavities to the expected number of positive cavities.

Depending e.g. on the biological material, the device and the kind of analysis, the method according to the first aspect of the disclosure may comprise further method steps. For example, the step of analyzing the biological material may comprise one or more steps comprising the preparation of the biological material for analysis, such as material amplification by thermal cycling during PCR (see below). For example, if the biological material is any kind of nucleic acid, such DNA or RNA, any kind of PCR and a Reverse transcription PCR may be performed, such as digital PCR. The method can further comprise a step of monitoring and detecting the presence or generation of gas bubbles in the device, a step of applying pressure onto the microfluidic device, for example by means of a pressure chamber surrounding at least the microfluidic device, and/or a step of applying a thermocycling temperature profile to the array of reaction areas.

In a preferred embodiment of the first aspect of the present disclosure, the polysiloxane having at least one hydroxy group has a mean molecular weight of 300 to 30,000 g/mol, preferably 400 to 20,000 g/mol, more preferably 600 to 10,000 g/mol, and most preferably 1000 to 6,000 g/mol, and/or the polysiloxane having at least one hydroxy group at 25° C. has a dynamic viscosity of 1 to 1,000 mPas, preferably 2 to 750 mPas, more preferably 5 to 500 mPas, even more preferably 10 to 250 mPas, still more preferably 15 to 200 mPas, and most preferably 20 to 150 mPas, and/or the cavity has a volume of 0.02 to 200 nl, preferably 0.05 to 50 nl, and more preferably 0.1 to 5 nl, and/or the number of cavities is preferably at least 96, more preferably at least 1,536, even more preferably at least 10,000, and most preferably at least 100,000 per device.

In a preferred embodiment of the first aspect of the present disclosure, the aqueous liquid separated into the at least two cavities is separated into portions that are identical and/or different from each other, and/or the aqueous liquid comprising biological material is a biological sample, preferably isolated from a human and/or being a blood, serum, tissue, saliva, urine or fecal sample.

In a second aspect, the present disclosure relates to a system for separating an aqueous liquid into at least two cavities, the system comprising:

a device having at least one void providing a separating space, and at least two cavities in fluidic connection with the void and separated by the separating space;

an aqueous liquid source comprising an aqueous liquid including biological material, for supplying the device with aqueous liquid;

a separation liquid source for supplying the device with separation liquid for separating the aqueous liquid into the at least two cavities, wherein the separation liquid comprises at least a polysiloxane having at least one hydroxy-group or consists of a polysiloxane having at least one hydroxy-group.

With respect to the system according to the second aspect of the present disclosure it is referred to the terms, examples and specific embodiments used in the context of the other aspects of the present disclosure, which are also applicable to this aspect.

The term "system" relates to the entirety of technical means necessary for separating an aqueous liquid into at least two cavities.

Among other components, the system according to the second aspect of the present disclosure comprises an aqueous liquid source. The term "aqueous liquid source" describes any technical and/or manual means for manually or mechanically supplying the device with aqueous liquid.

The system according to the second aspect of the present disclosure also comprises a separation liquid source. The term "separation liquid source" describes any technical and/or manual means for manually or mechanically supplying the device with aqueous liquid. If the device is supplied with more than one separation liquid, the system may comprise more than one separation liquid source. Specifically in the case that the device is supplied with several separation liquids comprising one and the same composition or type, the source of both can be implemented by one common sealing liquid reservoir.

Suitable technical and manual means for supplying the device with aqueous liquid or separation liquid are well-known to the person skilled in the art and also described elsewhere in this application.

The microfluidic system of the present disclosure can further feature different sensors that perform filling checks, correct placement checks, and the like.

The system may further comprise a control unit for controlling the pumping means to pump the various liquids through the void on demand, e.g. during dPCR. Here, the control unit can be triggered by hand by an operator, or automatically, e.g. based on a feedback signal from an additional system component detecting or monitoring the occurrence of gas bubbles inside the flow channel. Also, the control unit can instruct the pumping means to pump the liquids in pre-determined amounts through the void based on a predetermined pattern, for example based on the thermocycling steps to be applied to the aqueous liquid inside the reaction areas.

The microfluidic system can further comprise a bubble trap connected to the flow circuit, for separation of air from the separation liquid, the bubble trap being arranged downstream of the outlet of the device. Thereby, any gas bubbles flushed-out of the void of the microfluidic device by means of the streamed additional liquid can be removed from the separation liquid flowing in the flow circuit.

The microfluidic system can further comprise a detection means for analyzing the biological material or detecting the presence or generation of gas bubbles in the device, such as an optical imaging device, for example an optical camera, which can detect and/or monitor the presence or generation of gas bubbles inside the void before and during thermocycling, provided that the void allows an optical monitoring. Here, for example, the inside of the void can be made visible from the outside, for example by means of a viewing window, transparent walls of the flow channel, or the like. The means for analyzing the biological material can comprise means to analyze the analytical reaction in each of the at least two cavities separately, in parallel and/or sequentially, such as a fluorescence detection or imaging means to analyze the fluorescence in each cavity, and provide results on each cavity.

In order to be able to provide the sample material inside the reaction areas with a thermocycling temperature profile, the microfluidic system can comprise a thermal mount receiving the microfluidic device, for providing a thermocycling temperature profile to the array of reaction areas. Alternatively, the provision of a thermocycling temperature profile to the array of reaction areas can be implemented by means of a heating and/or cooling means for heating and/or cooling of the temperature of the additional sealing liquid to a desired thermocycling temperature profile temperature. Moreover, device can further comprise at least one sensor for controlling the temperature at the biological materials received in the device, wherein such sensor can be a temperature sensor, for example in combination with a fluid flow sensor.

According to a further specific embodiment of the dPCR microfluidic system of the present disclosure, the microfluidic system can additionally comprise a pressure chamber surrounding at least the microfluidic device.

Finally, the system according to aspect two may further comprise a control unit, which can control any kind of actuation or monitoring of the above described system and its components, wherein the term "control unit" as used herein encompasses any physical or virtual processing device, such as a CPU or the like, which can also control an entire laboratory instrument or even an entire workstation comprising one or more laboratory instruments in a way that workflow(s) and workflow step(s) are conducted. The control unit may, for example, carry different kinds of application software and instruct the automated processing system or a specific instrument or device thereof to conduct pre-analytical, post analytical and analytical workflow(s)/workflow step(s). The control unit may receive information from a data management unit regarding which steps need to be performed with a certain sample. Further, the control unit might be integral with a data management unit, may be comprised by a server computer and/or be part of one instrument or even distributed across multiple instruments of the automated processing system. The control unit may, for instance, be embodied as a programmable logic controller running a computer-readable program provided with instructions to perform operations. Here, in order to receive such instructions by a user, a user interface can additionally be provided, wherein the term "user interface" as used herein encompasses any suitable piece of application software and/or hardware for interactions between an operator and a machine, including but not limited to a graphical user interface for receiving as input a command from an operator and also to provide feedback and convey information thereto. Also, a system/device may expose several user interfaces to serve different kinds of users/operators.

In a preferred embodiment of the first aspect of the present disclosure, wherein the method is performed by means of a system according to the second aspect of the present disclosure, or of the second aspect of the present disclosure, the system is a microfluidic system and the device is a microfluidic device, the device further comprises at least one inlet and at least one outlet connected by said void, preferably wherein the void is a flow channel in the microfluidic device, and/or the cavities are fluid containers, and/or the void and/or the cavities and/or the flow channel have a hydrophilic surface, further preferably wherein the microfluidic system further comprises a flow circuit connectable to the microfluidic device, for flowing liquid through the void of the microfluidic device; and a pumping means connected to the flow circuit.

The term "microfluidic device" describes a device which provides microscale channels and microscale reaction areas receiving microliter or nanoliter-scale samples in the form of flowable sample liquid, such as aqueous sample liquid. Examples of a suitable microfluidic device are e.g. microfluidic chips.

Besides the separating space and the at least two cavities, the device usually further comprises at least one inlet and at least one outlet connected by the void.

The terms "inlet" and "outlet" describe any opening in the device allowing introducing or evacuation of fluids, i.e. liquids and gases, into and out of the device, respectively.

The inlet and the outlet may be arranged in the bottom, the top and/or in one or more of the side walls of the device. If the device comprises a support and a cover, the inlet and the outlet opening may be arranged in the support and/or in the cover of the device, preferably they are arranged in the support of the device.

The inlet may be used for the introduction of a liquid or gas into the void of the device, and the outlet may be used for the exit of liquid or gas from the void of the device. The inlet and the outlet of the void usually are connected by the void, preferably by fluidic connection, i.e. there is no kind of obstacle that may hinder a liquid that is filled into the inlet opening of the void to flow to the outlet opening of the void. The inlet and/or the outlet of the microfluidic device can be implemented in the form of a single connection port, respectively, such as a circular fluid tight port, for example in the form of a Luer Lock adapter or the like, for connection of the microfluidic device with the aqueous liquid source, or for connection of the microfluidic device with the separation liquid source.

Preferably, the void provides a flow channel in the device, which means that it allows the liquid introduced into the device to flow to its target region, such as to the at least two cavities and/or to the outlet. For example, the void is in the form of a closed filling channel on the side of the openings of the wells that is connected with a macroscopic filling inlet port on one side and an overflow outlet port on the other side.

Also preferably, the cavities are fluid containers. The term "fluid container" describes any container suitable for taking up a liquid, e.g. for providing a depository and/or reaction vessel for a liquid.

Preferably, the void and/or the cavities and/or the flow channel have a hydrophilic surface. For example, the hydrophilicity of the void surface and/or the cavities surface and/or the flow channel surface, presents itself with a surface contact angle in a range of about 30° to 90°, but can also be <30°, measured between the aqueous liquid and the surface. Preferably, the hydrophilicity of the void surface and/or the cavities surface and/or the flow channel surface, presents itself with a surface contact angle in a range of about <90°, more preferably <60°, e.g. 40° or <10°. Moreover, the void surface and/or the cavities surface and/or the flow channel surface, may also have different hydrophilicities.

Methods for adjusting the hydrophilicities of the surfaces of the void, the cavities and or the flow channel are well-known to the person skilled in the art. For example, a certain hydrophilicity may be provided either by material properties of the microfluidic device, by surface treatment of the respective surface, such as by means of plasma hydrophilization treatment, or by a hydrophilic coating provided on respective surface, such as a $SiO_2$ coating.

Also preferably, the microfluidic system comprises a flow circuit connectable to the microfluidic device, for flowing liquid through the void of the microfluidic device, for example for providing the microfluidic device with an aqueous or separation liquid, by means of the flow circuit. Further, the flow circuit can be implemented by means of a tubing system, for example a flexible tubing system consisting of one or several flexible tubes, which tubes can be made of an inner layer of ethylene propylene diene monomer (EPDM) rubber and an outer layer of nitrile butadiene (NBR) rubber, potentially also enforced with a synthetic mesh, or can be generally made of EPDM, NBR, fluorinated ethylene-propylene polymer (FEP), Polytetrafluoroethylene (PTFE), Polyvinyl chloride (PVC), polyethersulfone (PES), fluoroelastomer (FKM), silicone, and can additionally be jacketed by means of a heat isolating material. The flow circuit may be connected to the device via the inlet and outlet.

The term "pumping means" describes any means suitable for manually or mechanically supplying the flow circuit with liquid, such as aqueous liquid or separation liquid.

As an example, the mechanical pumping means of the present disclosure can be one of a peristaltic pump, a metering pump, a nanoliter pump or a syringe pump, or, alternatively—with additional fluidic components such as valves or the like—the pumping means of the present disclosure can be any other type of pump, e.g. a diaphragm pump, a wobble piston pump, a micro gear pump, or the like. For example, the separation liquid can be filled into the flow channel using peristaltic pumps applying a pressure of about 500 mbar.

The manual pumping means may, for example, be a pipette or a manual micro syringe pump driven by a person.

Moreover, the microfluidic system may comprise a detection means for e.g. analyzing the biological material, such as by detecting the presence, absence, activity or concentration of biological material in each of the at least two cavities, or for detecting the presence or generation of gas bubbles in the microfluidic device.

In a further preferred embodiment of the first and the second aspect of the present disclosure, the aqueous liquid comprises as biological material a nucleic acid to be analyzed, preferably wherein the nucleic acid is amplified when analyzed, and/or wherein the nucleic acid is analyzed in an amplification reaction, more preferably by polymerase chain reaction (PCR) or by an isothermal amplification reaction.

Suitable nucleic acids that may be analyzed using the method according to the first aspect of the disclosure or the system according to the second aspect of the disclosure are well-known the person skilled in the art and may be any kind of single-or double-stranded nucleic acid, preferably any kind of single- or double-stranded DNA or RNA, such as mRNA, miRNA or siRNA, ssDNA, dsDNA or cDNA or plasmid.

Preferably, the nucleic acid amplification, taking place in case a target molecule (analyte molecule) is present in a cavity, may either be detected while being amplified or after being amplified. More preferably the nucleic acid is amplified by polymerase chain reaction (PCR) or by an isothermal amplification reaction.

For example, during PCR, the nucleic acid is usually amplified by thermal cycling. In detail, thermal cycling, also referred to as thermocycling, is generally utilized to provide heating and cooling of the reactants in the sample within the reaction chamber for amplifying such DNA or RNA segments, wherein laboratory instruments including thermocyclers are commonly used in order to achieve an automatic procedure of diagnostic assays based on PCR, in which, during a PCR conduct, the liquid PCR-samples have to be heated and cooled to differing temperature levels repeatedly and have to be maintained for a certain amount of time at different temperature plateaus. As an example, in the course of a typical PCR conduct, a specific target nucleic acid is amplified by a series of reiterations of a cycle of steps in which nucleic acids present in the reaction mixture are (a) denatured at relatively high temperatures, for example at a denaturation temperature of more than 90° C., usually about 94° C. to 95° C., for separation of the double-stranded DNA, then (b) the reaction mixture is cooled down to a temperature at which short oligonucleotide primers bind to the single stranded target nucleic acid, for example at an annealing temperature of about 52° C. to 56° C. for primer binding at the separated DNA strands in order to provide templates (annealing), and, thereafter, (c) the primers are extended/elongated using a polymerase enzyme, for example at an extension temperature at about 72° C. for creation of new DNA strands, so that the original nucleic acid sequence is replicated. Repeated cycles of denaturation, annealing and extension, usually about 25 to 30 repeated cycles, result in the exponential increase in the amount of target nucleic acid sequence present in the sample. Now, in order to be able to accurately maintain such temperature plateaus during thermocycling, a uniform temperature distribution over the reaction zone should be maintained, so that all reaction areas can be heated and cooled uniformly to obtain uniform sample yields between the reaction areas containing the sample. For carrying out a regular PCR method, commonly known thermocycling devices, such as thermal cyclers/thermocyclers, for amplifying DNA segments can be used, which basically consist of a mount for receiving the samples, often also referred to as a sample tempering mount, and a heat pump attached to the mount, which heat pipe is often provided in the form of a combination of a Peltier element used for active heating and cooling of the mount and, thus, for actively controlling the temperature provided to the samples, and a respective heat sink thermally coupled to the Peltier element in order to dissipate the heat away and, for example, into the ambient environment.

Suitable PCR applications are, e.g. quantitative PCR (qPCR), digital PCR (dPCR), reverse transcription PCR (RT-PCR), Multiplex-PCR or Nested-PCR.

The method according to the first aspect of the disclosure and the device according to the second aspect of the disclosure may also be used in any form of isothermal amplification reaction. In general, an isothermal amplification reaction provides detection of a nucleic acid target sequence in a streamlined, linear or exponential manner, and is not limited by the constraint of thermal cycling. Suitable methods for isothermal amplification reactions are well-known to the person skilled in the art, such as loop-mediated isothermal amplification (LAMP) or reverse Transcription Loop-mediated Isothermal Amplification (RT-LAMP), Whole Genome Amplification (WGA), Strand Displacement Amplification (SDA), Helicase-Dependent Amplification (HDA), Recombinase Polymerase Amplification (RPA) or Nucleic Acid Sequences Based Amplification (NASBA), or Rolling Circle Amplification (RCA).

Methods for analyzing the nucleic acid in the aqueous liquid are well-known to the person skilled in the art and also described above.

If the nucleic acid is analyzed using a dye, suitable dyes are well-known to the person skilled in the art, such as 5 (6)-carboxyfluorescein (5-FAM and 6-FAM™), Cy3™, Cy5™, 6-carboxy-2',4,4',5',7,7'-hexachlorofluorescein (HEX™), 6-carboxy-4',5'-dichloro-2',7'-dimethoxyfluorescein (JOE™), 5 (6)-Carboxy-X-rhodamine (ROX™), 5-Carboxytetramethylrhodamin (TAMRA™), tetrachloro fluorescein (TET™), sulforhodamine 101 acid chloride (Texas Red®) or R-phycoerythrin-coupled sulforhodamine 101 acid chloride (PE-Texas Red®).

In a another preferred embodiment of the first and the second aspect of the present disclosure, the aqueous liquid comprises as biological material a protein to be analyzed, preferably wherein the protein is analyzed by an immunoassay, more preferably an assay employing an antibody or fragment thereof capable of specifically binding the protein.

The term "protein" describes a molecule comprising one or more long chains of amino acid residues. In general, a protein comprises at least 30 amino acids.

Protein may be analyzed by analyzing one or more of its inherent features, such as absorbance (as described above) or by protein labeling, such as by transition metals or an immunoassay.

For example, for protein labeling, transition metals (such as nickel) may be used to link specific residues in the probe to site-specific targets such as the N-termini, C-termini, or internal sites within the protein. Examples of further probes used for protein labeling include biarsenical tags, histidine (His) tags, FLAG tags, such as Ni-NTA-Atto conjugates (Na, Na-bis(carboxymethyl)-L-lysine, Nickel (II) complex, conjugated to Atto dye) which may provide specific and highly sensitive detection of His-tagged fusion proteins.

Preferably, the protein is analyzed by an immunoassay. The term "immunoassay" describes any biochemical test that measures the presence or concentration of a molecule, such as a protein, in a solution through the use of an antibody or a fragment thereof or an antigen, preferably an antibody or a fragment thereof. Examples for suitable antibodies are polyclonal antibodies, monoclonal antibodies, fragments thereof such as F(ab')2, and Fab fragments, as well as any naturally occurring or recombinantly produced binding partners, which are molecules that specifically bind one of the molecules to be specifically measured in a sample. Any antibody fragment retaining the above criteria of a specific binding agent can be used.

Usually, the antibody or the fragment thereof is further labeled to allow for detection of antibodies and antigens. The marker are typically chemically linked or conjugated to the desired antibody or antigen. Suitable markers are e.g. enzymes (e.g. for enzyme-linked immunosorbent assay (ELISA) or enzyme multiplied immunoassay technique (EMIT)), radioactive isotopes, DNA reporters, fluorogenic reporters (such as phycoerythrin), electroluminescent tags and label-free immunoassays. Preferably, the immunoassay is an ELISA.

An example for an enzyme used in ELISA is horseradish peroxidase enzyme (HRP), which may be tethered to an antibody that specifically recognizes the molecule of interest. This enzyme complex then catalyzes the reaction of a substrate that, when oxidized by HRP using hydrogen peroxide as the oxidizing agent, yields a characteristic color change that is detectable by spectrophotometric methods. For example, HRP catalyzes the conversion of chromogenic substrates (e.g., TMB, DAB, ABTS) into colored products, and produces light when acting on chemiluminescent substrates (e.g. enhanced chemiluminescence by luminol).

The expression "specifically binding the protein" describes any interaction between an antibody and an antigen, such as any non-covalent binding, e.g. by ionic binding, hydrogen bonding or Van der Waals forces.

In a third aspect, the present disclosure relates to the use of a polysiloxane having at least one hydroxy group in a method for separating an aqueous liquid according to the first aspect of the present disclosure or a system according to the second aspect of the present disclosure.

With respect to the use according to the third aspect of the present disclosure it is referred to the terms, examples and specific embodiments used in the context of the other aspects of the present disclosure, which are also applicable to this aspect.

The method according to the first aspect of the disclosure and the device according to the second aspect of the disclosure may for example be used in any method requiring the separation of aqueous liquid in at least two cavities, such as any kind of PCR application (such as quantitative PCR (qPCR), digital PCR (dPCR), reverse transcription PCR (RT-PCR), Multiplex-PCR or Nested-PCR) or immunoassays (such as ELISA). Further examples for the use of the method according to the first aspect of the disclosure and the device according to the second aspect of the disclosure are also described elsewhere in this application.

The above described inventive method as well as the system of the present disclosure can be part of an automated processing system, such as an analytical, pre-analytical or post-analytical processing system, which is commonly employed in state-of-the-art laboratories for automatically processing biological samples, which can encompass any apparatus or apparatus component operable to execute one or more processing steps/workflow steps on one or more biological samples, and covers analytical instruments, pre-analytical instruments, and also post-analytical instruments. The expression "processing steps" thereby refers to physically executed processing steps, such as conducting the particular steps of a dPCR conduct. The term "analytical" as used herein encompasses any process step carried out by one or more laboratory devices or operative units which are operable to execute an analytical test on one or more biological samples. In the context of biomedical research, analytical processing is a technical procedure to characterize the parameters of a biological sample or of an analyte. Such characterization of parameter comprises, for example, the determination of the concentration of particular proteins, nucleic acids, metabolites, ions or molecules of various sizes in biological samples derived from humans or laboratory animals, or the like. The gathered information can be used to evaluate e.g. the impact of the administration of drugs on the organism or on particular tissues. Further analyses may determine optical, electrochemical or other parameters of the biological samples or the analytes comprised in the sample material.

As used herein and also in the appended claims, the singular forms "a", "an", and "the" include plural reference unless the context clearly dictates otherwise. Similarly, the words "comprise", "contain" and "encompass" are to be interpreted inclusively rather than exclusively; that is to say, in the sense of "including, but not limited to". Similarly, the word "or" is intended to include "and" unless the context clearly indicates otherwise. The terms "plurality", "multiple" or "multitude" refer to two or more, i.e. 2 or >2, with integer multiples, wherein the terms "single" or "sole" refer to one, i.e. =1. Furthermore, the term "at least one" is to be understood as one or more, i.e. 1 or >1, also with integer multiples. Accordingly, words using the singular or plural number also include the plural and singular number, respectively. Additionally, the words "herein," "above,", "previously" and "below" and words of similar import, when used in this application, shall refer to this application as a whole and not to any particular portions of the application.

The description of specific embodiments of the present disclosure is not intended to be exhaustive or to limit the disclosure to the precise form disclosed. While the specific embodiments of, and examples for, the present disclosure are described herein for illustrative purposes, various equivalent modifications are possible within the scope of the disclosure as presented by the appended claims, as those skilled in the relevant art will recognize. Specific elements of any foregoing and later described embodiments can be combined or substituted for elements in other embodiments. Also, in drawings, same reference numerals denote same elements to avoid repetition, and parts readily implemented by one of ordinary skill in the art may be omitted. Furthermore, while advantages associated with certain embodiments of the disclosure have been described in the context of these embodiments, other embodiments may also exhibit such advantages, and not all embodiments need necessarily exhibit such advantages to fall within the scope of the disclosure as defined by the appended claims.

The following examples are intended to illustrate specific embodiments of the present disclosure. As such, the specific implementations as discussed hereinafter are not to be construed as limitations on the scope of the present disclosure. It will be apparent to the person skilled in the art that various equivalents, changes, and modifications may be made without departing from the scope of the present disclosure as defined by the appended claims, and it is thus to be understood that such equivalent embodiments are to be included herein. Further aspects and advantages of the present disclosure will become apparent from the following description of particular embodiments illustrated in the figures.

EXAMPLES

FIG. 1 shows a schematic illustration of a device 1 for conducting multiple analyses in parallel as used in an embodiment of the method or the system of the present disclosure, by means of an exploded perspective view. The device 1 basically comprises two parts, such as a support 2 and a cover 7 in the form of a plate or foil, which parts 2, 7 can be attached to each other. In one surface of the support 2, a void 4 is provided, which further provides a surface into which an array of cavities 3 is introduced. Here, for illustrative purposes, only a small number of cavities 3 within the void 4 is shown. Moreover, the device comprises an inlet 5 and an outlet 6 introduced in the support 2.

Figure 2:
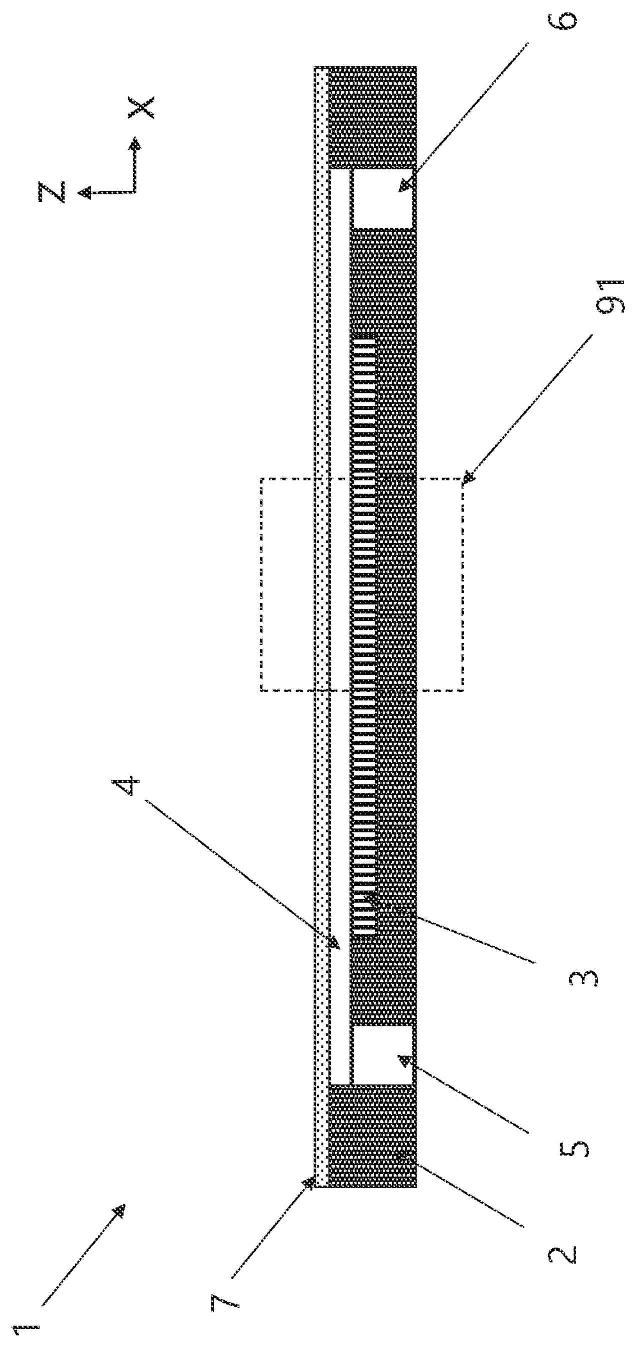
FIG. 2 is a cross-sectional schematic illustration of a device for conducting multiple analysis in parallel as used in an embodiment of the method or the system of the present disclosure.

FIG. 2 shows a schematic illustration of a device 1 for conducting multiple analyses in parallel as used in an embodiment of the method the system or the use of the present disclosure in cross-sectional view. In addition to the description of FIG. 1, it is shown that the cover 7 may be closely attached to the support 2 and thereby cover the void 4 in one of the surfaces of the support 2, while the at least two cavities 3 are in fluidic connection with the void 4. Moreover, it is shown that the inlet 5 and the outlet 6 may provide the only openings of the void for introducing and draining of liquids or fluids into and from the void 4. The detail section 91 schematically marks an exemplary section comprising 6 cavities, which is shown in detail in FIG. 3.

Figure 3:
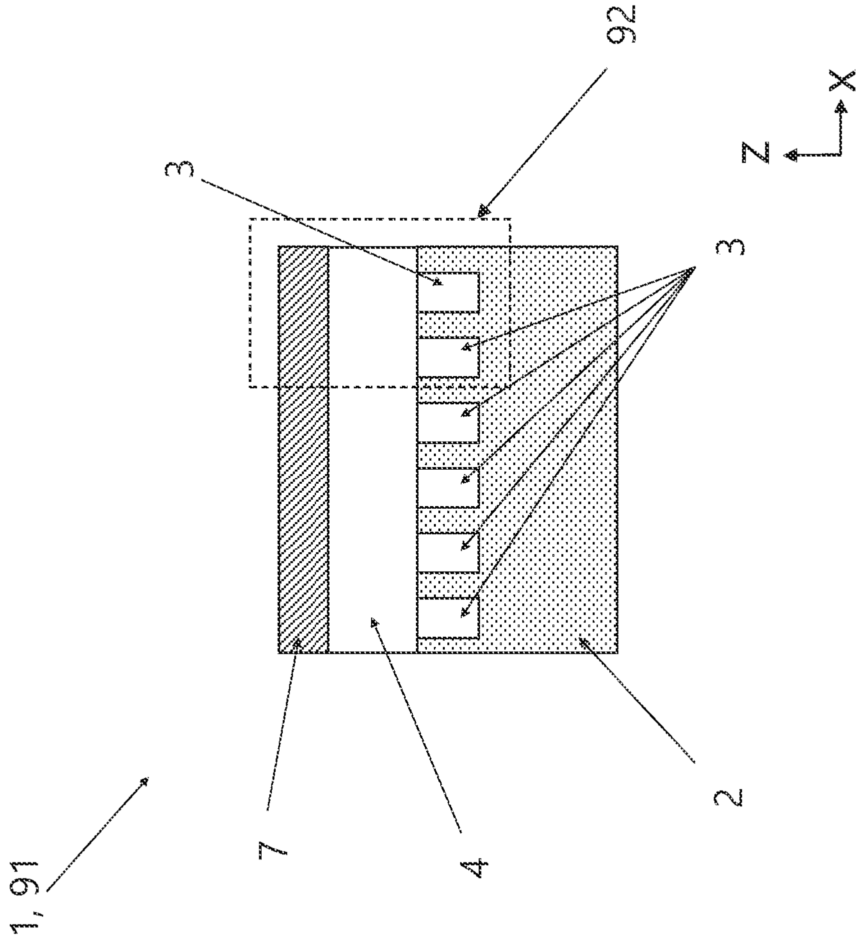
FIG. 3 is a schematic illustration of the detail section of FIG. 2 showing a device section comprising six cavities.

FIG. 3 shows a schematic illustration of the detail section 91 of FIG. 2. In detail, FIG. 3 shows a device section comprising 6 cavities. The descriptions of FIG. 1 and FIG. 2 are also applicable to this figure. It is shown in more detail that the at least two cavities 3, which are considered to be empty in this figure, are in fluidic connection with the void 4. The detail section 92 schematically marks an exemplary section comprising two cavities, which is shown in detail in FIG. 4.

Figure 4:
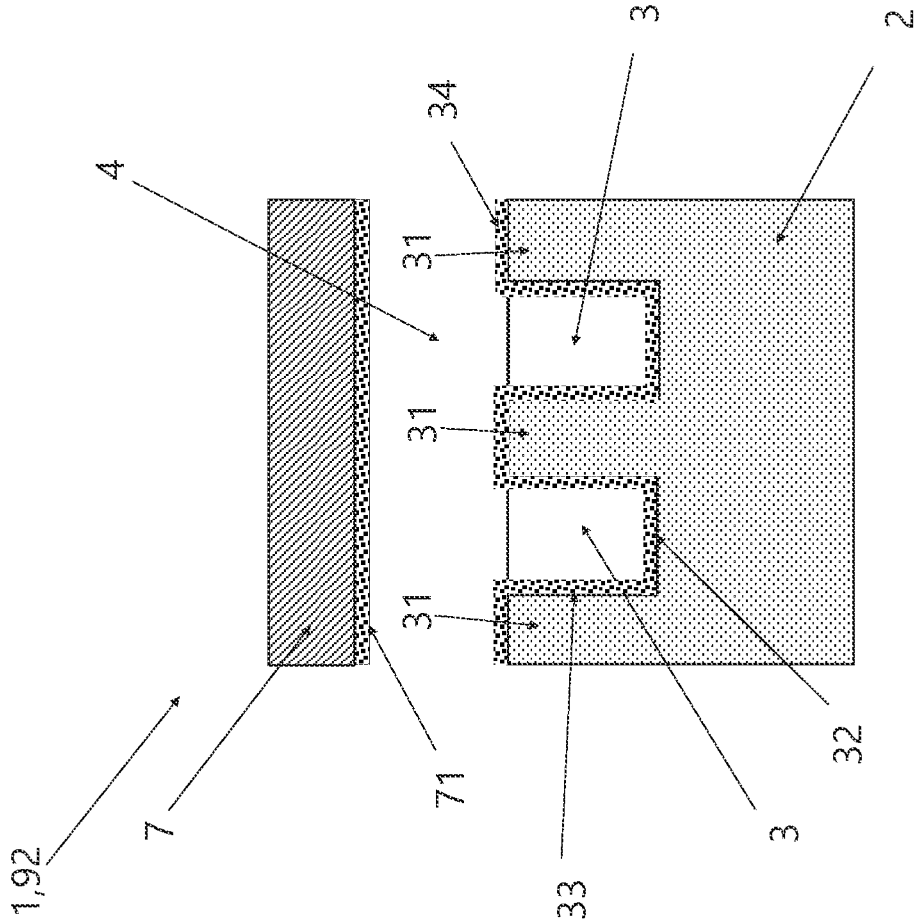
FIG. 4 is a schematic illustration of the detail section of FIG. 3 showing a device section comprising two cavities.

FIG. 4 shows a schematic illustration of the detail section 92 of FIG. 2 focusing on a device section comprising two cavities. In addition to the descriptions of FIG. 1, FIG. 2 and FIG. 3, FIG. 4 provides more details to the cavities 3 and the coatings 71 and 34 of the surfaces of the support 2 and the cover 7, respectively. In detail, it is indicated in FIG. 4 that the cavities are separated from each other by rims 31, which are arranged between the cavities 3 and which emerge by introducing cavities 3 into the surface of the support 2. Each cavity has a bottom 32 and at least one side wall 33 (the number of side walls 33 depending on the shape of the bottom 32). The at least one side wall 33 of a cavity 3 is further a surface of a rim 31 between the cavities 3. The cavities 3 are in fluidic connection with the void 4. The cover 7 comprises a coating 71, such as a $SiO_2$ coating, which is applied to its bottom surface, i.e. the surface covering the void 4. The support 2 comprises a coating 34, such as a $SiO_2$ coating, which is applied to the surface providing the void 4. In detail, the coating 34 of the support 2 covers the surface of the support 2, in which the cavities 3 are introduced, the side walls 33 of the cavities 3, the bottom 32 of the cavities and the top surface of the rim 31, which is part of the surface of the support 2, in which the cavities 3 are introduced.

Figure 5:
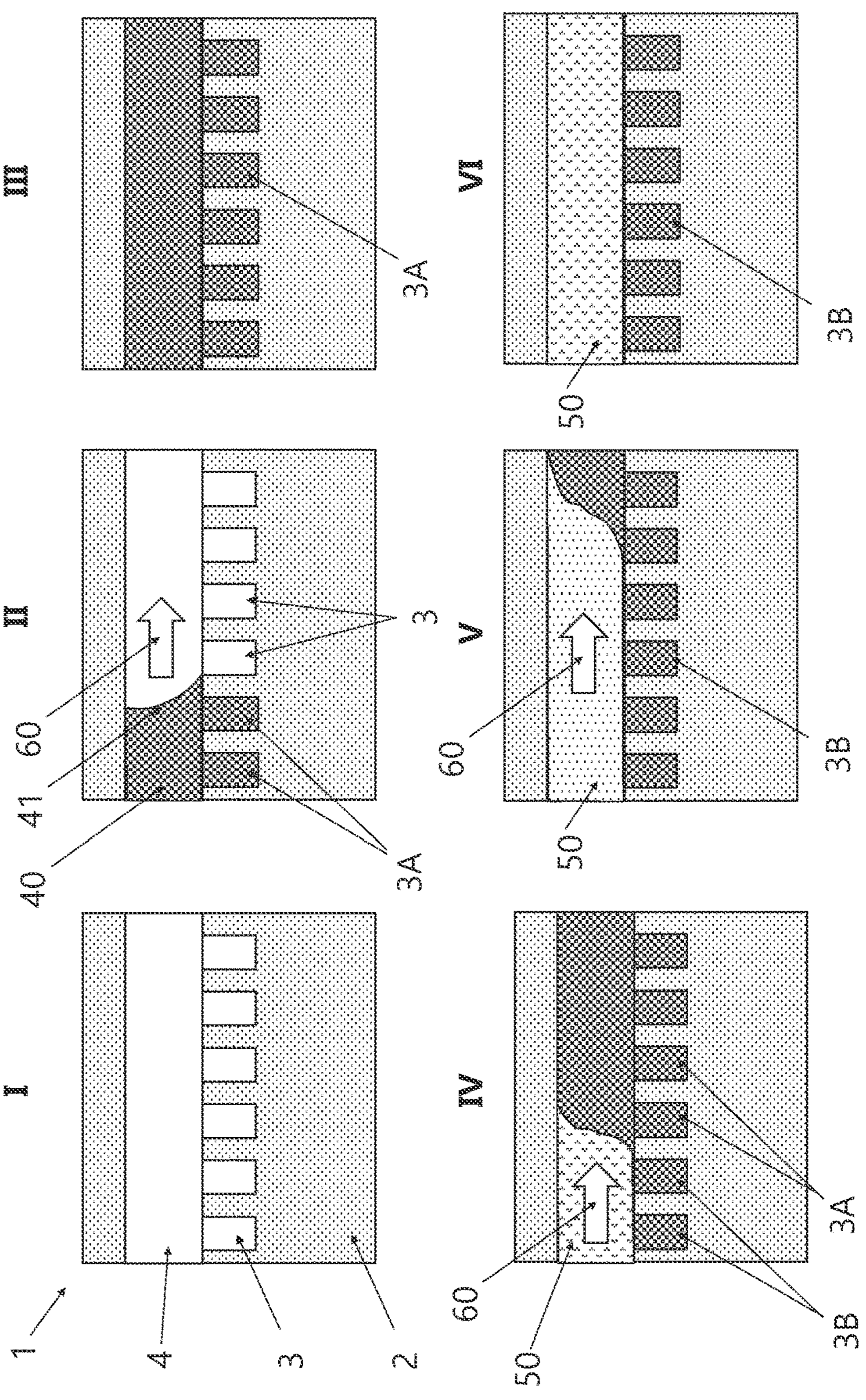
FIGS. 5 I-VI are schematic illustrations of a progress of an aqueous liquid (I-III) followed by separation liquid (IV-VI) through a void with six exemplary cavities of the device of FIG. 1 in cross-sectional view.

The schematic illustrations of FIG. 5 show the progress of supplying the device 1 with aqueous liquid 40 (FIG. 5 I-III) followed by supplying the device 1 with separation liquid comprising at least a polysiloxane having at least one hydroxy-group, or consists of a polysiloxane having at least one hydroxy-group (FIG. 5 IV-VI). Shown is a cross-sectional view of a device as exemplarily explained for FIG. 3 with six exemplary cavities (FIG. 5 I). FIG. 5 II illustrates the step of supplying the device with aqueous liquid 40. During this process, the aqueous liquid 40 is flowing trough the void 4 and forms a meniscus 41 in the direction of flow 60. The direction of flow 60 is indicated by an arrow. During In parallel, the cavities 3 are filled one after another with aqueous liquid 40. So while a part of the void 4 is filled with aqueous liquid 40 and the cavities 3A close to this part of the void 4 have already been filled with aqueous liquid 40 as well, the remaining cavities 3 close to the part of the void 4, which has not yet been filled with aqueous liquid 40, do also not comprise aqueous liquid 40. In FIG. 5 III, the step of supplying the at least two cavities 3 with aqueous liquid 40 is completed and ideally the whole void 4 and all cavities 3A are filled with aqueous liquid 40. However, it is still possible that in an unfortunate case air bubbles may occur or not all cavities 3 are filled.

FIG. 5 IV to VI illustrate the process of supplying the device with separation liquid 50. During this process, the separation liquid 50 is flowing into the void 4, while at the same time the remaining aqueous liquid 40 in the void 4 is displaced. Excess aqueous liquid may leave the void 4 by flowing towards the outlet 6, and may optionally leave the device 1 through the outlet 6. Again the direction of flow 60 is indicated by an arrow. In parallel, the cavities 3A are separated from each other by the separation liquid 50 over time. So while a part of the void 4 is filled with separation liquid 50 and the cavities 3B close to this part of the void 4 have already been separated by the separation liquid 50, the remaining cavities 3A close to the part of the void 4, which has not yet been filled with separation liquid 50, have not yet been separated. The separation liquid 50 only replaces the aqueous liquid 40 in the void 4, but does not replace the aqueous liquid in the cavities 3A. Thereby, the cavities filled with aqueous liquid 3B are separated from each other by the separation liquid 50. In FIG. IV this progress has just begun, while it is advanced in fig. V and finished in fig. VI, where all cavities 3B filled with aqueous liquid are separated from each other by the separation liquid 50.

Figure 6:
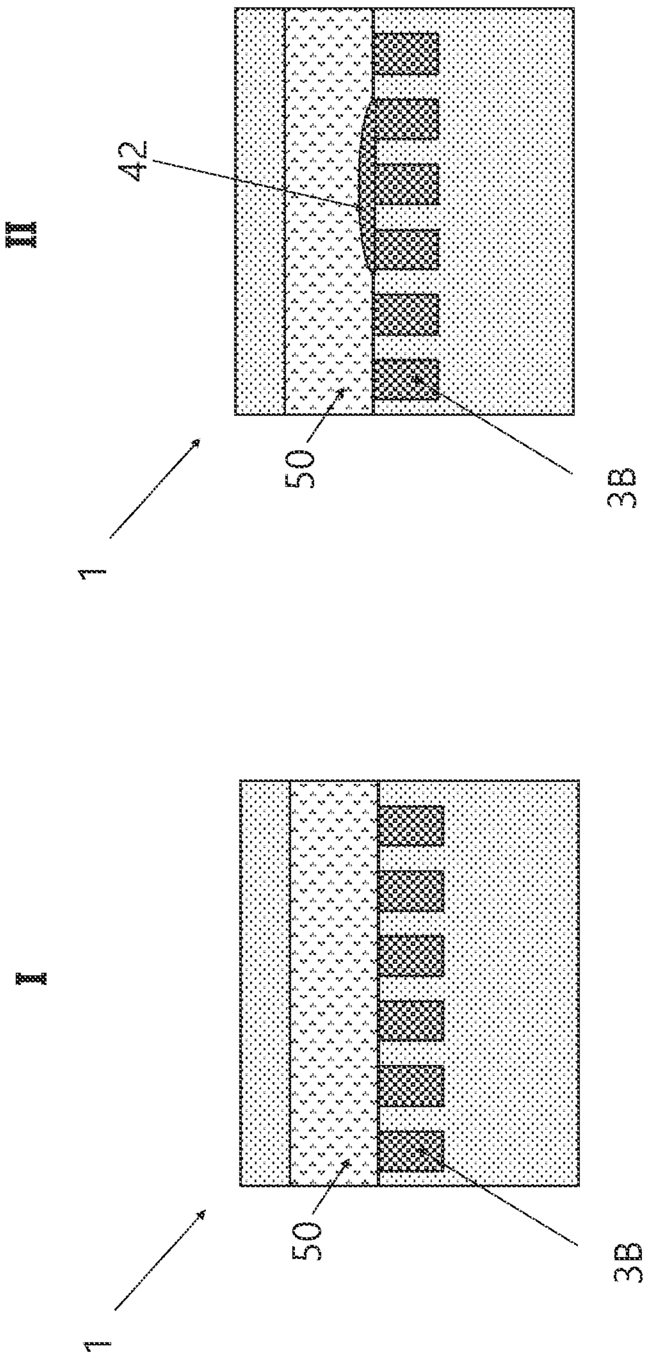
FIG. 6 I and II are schematic illustrations of the device of FIG. 1 with six exemplary cavities of in cross-sectional view, wherein the cavities are filled with aqueous liquid and separated by separation liquid (I) or only incompletely separated by separation liquid (II) (leakage).

FIG. 6 shows schematic illustrations of the device of FIG. 1 with six exemplary cavities of in cross-sectional view, wherein the cavities 3B are filled with aqueous liquid and all separated by separation liquid 50 (FIG. 6 I, see also FIG. 5 VI) or only incompletely separated by separation liquid 50 (FIG. 6 II). FIG. 6 II illustrates the situation of a leakage as described above. In detail, the aqueous liquid is not perfectly separated by the separation liquid 50 in all of the cavities 3B. Instead, in FIG. 6 II, a residual film 42 between three cavities still connects the aqueous liquids of both and allows exchange of components of one cavity to the other (cross-contamination), leading to false results.

Experiment 1: Effectiveness of Various Separation Liquids

Various separation liquids were tested for their effectiveness in separating an aqueous liquid.

For these experiments, the following devices were used:

| | A | B | C |
|---|---|---|---|
| Area of cavities [$mm^2$] | 6 × 85 | 6 × 85 | 6 × 85 |
| Number of cavities per device 1 | 20 k | 30 k | 100 k |
| Volume per cavity [nl] | 2.5 | 1 | 0.133 |
| Shape of cavity, arrangement | Hexagonal, honeycomb | Hexagonal, honeycomb | Hexagonal, honeycomb |
| Length of cavity [mm] | 0.2 | 0.15 | 0.06 |
| Width of cavity [mm] | 0.1 | 0.07 | 0.03 |
| Depth of cavity [mm] | 0.16 | 0.12 | 0.06 |
| Open depth of void [mm] | 0.02 to 0.25 | 0.02 to 0.15 | 0.02 to 0.15 |
| Type of Coating | Silica | Silica | Silica |

The following liquids were used as reference liquids:

| Class | Substance-Name | General Structure | Specifications A to X: Variants With specifications such as viscosity 25° C., molecular Mass, nD (Refraction index), as specified by supplier, n: most frequent length, [CAS-number] |
|---|---|---|---|
| R1 | Mineraloil/Parafinoil | $H_3C—(CH2)_{n-2}—CH_3$ | A: Mineraloil, 10 mPas, [8042-47-5]<br>B: Parafinoil, 50 mPas, [8042-47-5] |
| R2 | Poly-dimethyl-siloxane PDMS Dimethicone | 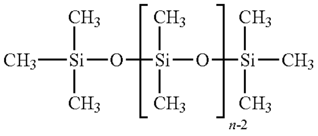 | A: 10 mPas, ~1200g/mol, n ~ 14, [63148-62-9]<br>B: 25 mPas, ~2500 g/mol, n ~ 30, [63148-62-9]<br>C: 50 mPas, ~3500 g/mol, n ~ 43, [63148-62-9]<br>D: 200 mPas, ~9300 g/mol, n ~ 123, [63148-62-9] |
| R3 | General alkyl-phenyl- mixed poly-siloxane | 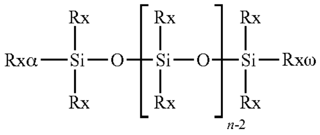 | A: Mixed Di-methyl, di-phenyl-polysiloxan: wherein both Rx at one Si are identical and selected from methyl and phenyl, Rxα, Rxω: Methyl-100 to 125 mPas, 1200 to 1500 g/mol, nD = 1.430 to 1.440, n ~ 10 [68083-14-7] |
| R4 | General alkyl and alkyl-mixed poly-siloxane | 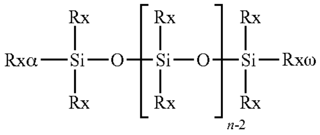 | A: wherein from both Rx at one Si one Rx is Methyl- and the other Rx is 3-3-3-Trifluorproypl-, ~1000 g/mol 80 to 120 mPas, n ~ 6 [63148-56-1]<br>B: Rx Ethyl, 40 to 50 mPas, 500 to 800 g/mol, n ~ 6 [63148-61-8]<br>C: Mixed di-methyl, methyl -octadecyl -polysiloxan: Wherein either both Rx at one Si are methyl or, wherein from both Rx at one Si one Rx is methyl and the other Rx is octadecyl, Rxα, Rxω: Methyl-Mol-fraction of Methyl-Octadecyl-silxan: 45 to 55% 40 to 70 mPas, nD = 1.445 to 1.450 n ~ 6 [191044-49-21 |

The following table shows separation liquids according to the present disclosure: were investigated, representing also an increasing molecular weight and length of the polymer chain (expressed by n).

| Class | Substance-Name | General Structure | Specifications A to X: Variants With specifications such as viscosity 25° C., molecular Mass, nD (Refraction index), as specified by supplier, n: most frequent length, [CAS-number] |
|---|---|---|---|
| X1 | α,ω- Silanol-terminated-Poly-Dimethyl-Siloxane (Dimethiconol) | 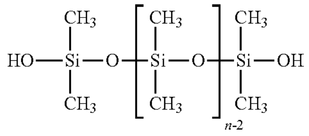 | A: 16 to 32 mPas, 400 to 700 g/mol, n ~ 3, [70131-67-8] B: 35 to 45 mPas, 700 to 1500 g/mol, n ~ 14, [70131-67-8] C: 45 to 85 mPas, 2000 to 3500 g/mol, n ~ 40, [70131-67-8] D: 90 to 120 mPas, ~4200 g/mol, n ~ 50, [70131-67-8] |
| X2 | General Silanol-terminated-poly-siloxane | 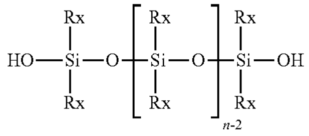 | A: Mixed Di-methyl, di-phenyl-polysiloxan: wherein both Rx at one Si are identical and selected from methyl and phenyl, 50 to 60 mPas, ~1000 g/mol, Molfraction of Dipheylsiloxan in Polymer: 14 to 18%, n ~ 10, [68951-93-9] |
| X3 | α,ω-Carbinol-terminated poly-siloxane | 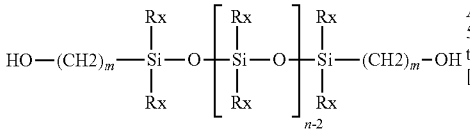 | A: Rx Methyl, m = 3, 50 to 60 mPas, 600 to 850 g/mol, n ~ 8, [104780-66-7] |
| X4 | ω-Carbinol-terminated poly-siloxane | 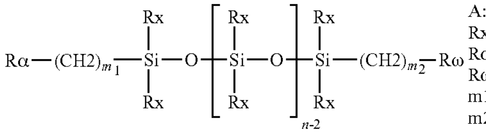 | A: Rx: Methyl- Rα : H Rω: OH m1 = 1 m2 = 3 Mw = 3000 to 4000 g/mol nD 1.40 to 1.41, 60 to 70 mPas, n ~ 40 to 50 [CAS: not available/proprietary product] |

The separation liquids of the present disclosure and the reference liquids are commercially available products, e.g. available at Merck or manufacturers of silicon products.

The liquids either from the group R1 to R4 or X1 to X4 were either commercially available products, such as from Merck or Sigma-Adrich, or from manufacturers of silicones-, polysiloxanes silicone-polymers or precursors of such products, or were derived from commercially available products, by men skilled in the art.

In many cases, homolog series of a product have been investigated, e.g. PDMS-products with a viscosity of either 5 mPas, 10 mPas, 25 mPas, 50 mPas, 100 mPas or 200 mPas The effectiveness of the reference liquid or the separation liquid in separating an aqueous liquid was investigated using the following configurations:

1. A sample containing a human genomic DNA to be analyzed was mixed with a PCR-mastermix, forming a reaction mix.
2. A device (any one above-mentioned A, B or C) having a multitude of cavities was provided.
3. The reaction mix was introduced into the device using pressure of 0 to 300 mbar, filling the device within a time-frame of 5 to 180 sec, thereby filling the cavities.

4. The separation liquid was introduced into the device using pressure of 50 to 300 mbar, separating the cavities within a time-frame 5 to 180 sec.
5. The hot-start PCR was executed, over 40 cycles, whereby positive reactions formed a fluorescence signal, and the signal of each cavity was detected.
6. An analytical result was derivated from the observed signals of the cavities, whereby counting the number of positive reactions was used to calculate a concentration of target molecules in the sample.

In a typical experiment for monitoring the effectiveness of separation fluids, as target analyte, human g-DNA were used as target analyte, more specifically the beta-Globin code locus in the chromosome 11. The target concentration of the analyte is adjusted to be in a range of 0.05 to 0.5 copies per cavity volume, correspondingly:

| | A | B | C |
|---|---|---|---|
| Cavity Volume | 2.5 nl | 1 nl | 0.133 nl |
| For a positivity-rate = N(positives)/N(all) | 1 of 10 | 1 of 10 | 1 of 10 |
| Number of Target Molecules per Volume | 0.1/2.5 nl = 40 molec./ul | 0.1/1 nl = 100 molec./ul | 0.1/0.133 nl = 750 molec./ul |

A positivity rate in the range as mentioned above allows an efficient screening for leakage. At lower concentrations, the frequency of positive cavities is too low, and at higher concentrations too high. Of course, in the final application, the positivity rate will be in many cases unknown, and is subject to be found out, resp. to be analyzed.

As mastermix, e.g. Roche LightCyler® Control DNA Kit (Cat. No. 12 158 833 001) was used, including all elements to produce a positive fluorescence signal upon the presence of the target analyte, especially primers, probes, FastStart Master, SYBR Green I DNA interchealator dye, $Mg^{2+}$ surfactants, and BSA.

The aqueous liquid was filled manually and by capillary force to the device.

The separation liquid was filled manually, applying a pressure of 50 to 300 mbar by a pneumatic system. Pressurizing was interrupted as soon as all cavities have been filled and separated.

Thermal cycling was used to generate a detectable signal for all cavities containing a target molecule (or showing leakage). The standard thermal profile of the PCR-kit was used, but temperature slopes have been adapted to a range of 0.5 to 2° C./sec.

After thermal cycling, the device, and in particular the cavities, have been fluorescence imaged using an excitation wavelength of 480 nm/20 nm and an emission wavelength of 535 nm/30 nm.

For validating the effectiveness of the separation by the separation fluid, the rate of positive cavities was determined and calculated and compared to the value which is expected by a leakage free situation. On top, visual inspection was used, especially looking at positive cavities and their neighboring (initially negative) cavities, or looking to wider areas, showing in case of large fields of cavities being more or less positive (showing fluorescence).

Leakage was rated as follows:

| Ratio of cavities showing leakage (100% = all cavities of the device) | Rating of Leakage |
|---|---|
| <0.2% | “absent” |
| 0.2% to 1% | “very rare” |
| 1 to 2.5% | “rare” |
| 2.5 to 5% | “some” |
| 5% to 10% | “frequent” |
| 10 to 100% | “very frequent” |

Results:

The following table shows the results of the effectiveness in separating an aqueous liquid for the reference liquids and the separation liquids of the present disclosure.

| # | Substance Class | Substance Name* | Leakage observed** |
|---|---|---|---|
| 1 | R1 | Mineraloil, Parafinoil | “frequent“ to “very frequent” |
| 2 | R2 | Poly-dimethyl-siloxane PDMS, Dimethicone | “frequent” to “very frequent” |
| 3 | R3 | General alkyl-phenyl-mixed poly-siloxane | “frequent” to “very frequent” |
| 4 | R4 | General alkyl and alkyl-mixed poly-siloxane | “very frequent” |
| 5 | X1 | α, ω-Silanol-terminated-Poly-Dimethyl-Siloxane (Dimethiconol) | “absent” to “very rare” |
| 6 | X2 | General Silanol-terminated-poly-siloxane | “absent” to “very rare” |
| 7 | X3 | α, ω-Carbinol-terminated poly-siloxane | “absent” to “very rare” |
| 8 | X4 | ω-Carbinol-terminated poly-siloxane | “absent” to “very rare” |

In detail, it was analyzed for each reference liquid or separation liquid, how many cavities of each device showed leakage when analytical results were derivated from the cavities.

As explained above, “leakage”, whose synonyms are crosstalk, cross contamination, or carry-over, means that the aqueous liquid is not perfectly separated to the cavities. Instead, an aqueous film between at least two cavities still connects the aqueous liquids of both and allows exchange of components of one cavity to the other.

If, in the present example, 5 to 100% of cavities of a device showed leakage, the leakage observed was determined to be “frequent” to “very frequent”. If only 0 to 1% of cavities were leaking, the leakage observed was determined to be “absent” to “very rare”.

All reference liquids tested showed frequent to very frequent leakage, i.e. in 5 to 100% of the cavities of a device, when applied to separate the aqueous liquid to the different cavities. In contrast, all separation liquids according to the present disclosure had a much lower rate of leakage in a range of absent to very rare, in a range of 0 to 1% of the cavities. The observed overall reduction of leakage (before/after) by the new separation fluid was in some cases 20 to >100-fold, generally >10fold.

While the current disclosure has been described in relation to its specific embodiments, it is to be understood that this description is for illustrative purposes only. Accordingly, it is intended that the disclosure be limited only by the scope of the claims appended hereto.

LIST OF REFERENCE NUMERALS

1 Device for conducting multiple analysis in parallel
2 Support
3 Cavity/Cavities
31 Rim between cavities
32 Bottom of cavity
33 Side wall of cavity
34 Coating
3A Cavity, filled with aqueous liquid
3B Cavity, separated with separation liquid
4 Void
5 Inlet
6 Outlet
7 Cover
71 Coating of cover
40 Aqueous liquid
41 Meniscus
42 Residual Film
50 Separation liquid
60 Direction of flow
91 Detail section
92 Detail section

The invention claimed is:

1. A method for reducing leakage when separating an aqueous liquid comprising biological material into at least two cavities, the method comprising the steps of:

a) providing a device having at least one void providing a separating space, and at least two cavities in fluidic connection with the void and separated by the separating space;

b) supplying each of the at least two cavities with the aqueous liquid; and c) supplying the separating space with a separation liquid for separating the aqueous liquid into the at least two cavities such that leakage between said cavities is reduced; and, d) analyzing the aqueous liquid wherein the step of analyzing the aqueous liquid comprises determining the absence, presence, activity or concentration of biological material in the aqueous liquid, wherein the separation liquid in step c) comprises a polysiloxane having at least one hydroxy-group, and the %-mass ratio of hydroxy in the separation liquid is between 0.1% and 5%.

2. The method according to claim 1, wherein the aqueous liquid comprises as biological material a nucleic acid to be analyzed, wherein the nucleic acid is amplified when analyzed by polymerase chain reaction (PCR) or by an isothermal amplification reaction.

3. The method according to claim 1, wherein the aqueous liquid comprises as biological material a protein to be analyzed, wherein the protein is analyzed by an assay employing an antibody or fragment thereof capable of specifically binding the protein.

4. The method according to claim 1, wherein the aqueous liquid comprises reagents allowing for analyzing the biological material.

5. The method according to claim 1, wherein the polysiloxane has at least two hydroxy groups.

6. The method according to claim 1, wherein the polysiloxane having at least one hydroxy group comprises a silanol group and/or a carbinol group.

7. The method according to claim 6, wherein, in the polysiloxane comprising a carbinol group, the carbinol group linked to a silicon atom of the polysiloxane comprises a $C_1$ to $C_8$-alkyl group.

8. The method according to claim 1, wherein the polysiloxane is a linear chain molecule comprising 15 to 70 units of $—[O—SiRx_2]—$, each Rx may be independently selected from the group consisting of substituted or unsubstituted $C_1$-$C_{20}$-alkyl or aromatic groups; wherein one, two or three hydrogen atoms linked to each carbon of the $C_1$-$C_{20}$-alkyl, are independently from the other hydrogen atoms substituted with a halogen, and the aromatic group is a substituted or unsubstituted phenyl, tolyl or benzyl.

9. The method according to claim 1, wherein the polysiloxane having at least one hydroxy group has a structure according to at least one of formula (I)

(I)

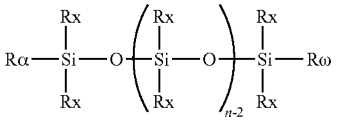

formula (II)

(II)

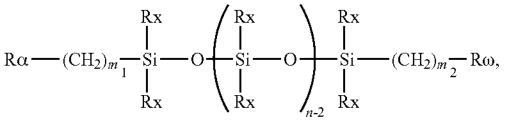

formula (III)

(III)

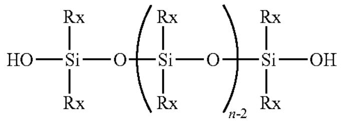

and formula (IV)

(IV)

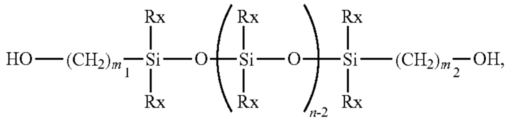

wherein n=15 to 70;

wherein $m_1$=2 to 6, wherein $m_2$=2 to 6, and wherein each Rx is independently selected from the group consisting of $—CH_3$, $—CH_2—CH_3$, $—CH_2—CH_2—CH_3$, $—CH—(CH_3)_2$, $—CH_2$ $(—CH_2)_p—CH_3$, $—CH_2—CH_2—CF_3$, $—CF_2—CF_2—CF_3$, $—CF_2$ $(—CF_2)_p—CF_3$,phenyl, tolyl and/or benzyl, with p=1 to 10, and wherein at least one Rα or Rω is selected to be —OH, and the other to —OH or $—CH_3$.

10. The method according to claim 1, wherein the polysiloxane having at least one hydroxy group has a structure according to formula (V)

(V)

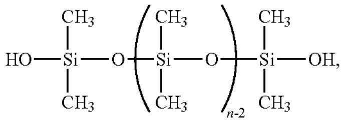

wherein the median of n=5 to 300 and
wherein n=5 to 300.

11. The method according to claim 1, wherein
the polysiloxane having at least one hydroxy group has a mean molecular weight of 300 to 30,000 g/mol and
the polysiloxane having at least one hydroxy group at 25° C. has a dynamic viscosity of 1 to 1,000 mPas, and
the cavity has a volume of 0.02 to 200 nl.

12. The method according to claim 1, wherein
the aqueous liquid separated into the at least two cavities is separated into portions that are identical and/or different from each other, and
the aqueous liquid comprising biological material is a biological sample-isolated from a human and/or being a blood, serum, tissue, saliva, urine or fecal sample.

* * * * *